(12) United States Patent
Northrop et al.

(10) Patent No.: US 9,423,174 B2
(45) Date of Patent: Aug. 23, 2016

(54) CRYOGENIC SYSTEM FOR REMOVING ACID GASES FROM A HYDROCARBON GAS STREAM, AND METHOD OF REMOVING ACID GASES

(75) Inventors: Paul Scott Northrop, Spring, TX (US); Bruce T Kelley, Kingwood, TX (US); Charles J Mart, Baton Rouge, LA (US)

(73) Assignee: ExxonMobil Upstream Research Company, Spring, TX (US)

(*) Notice: Subject to any disclaimer, the term of this patent is extended or adjusted under 35 U.S.C. 154(b) by 700 days.

(21) Appl. No.: 13/255,219

(22) PCT Filed: Jan. 22, 2010

(86) PCT No.: PCT/US2010/021785
§ 371 (c)(1),
(2), (4) Date: Sep. 7, 2011

(87) PCT Pub. No.: WO2010/123598
PCT Pub. Date: Oct. 28, 2010

(65) Prior Publication Data
US 2012/0031144 A1 Feb. 9, 2012

Related U.S. Application Data

(60) Provisional application No. 61/170,919, filed on Apr. 20, 2009.

(51) Int. Cl.
| | | |
|---|---|---|
| *F25J 3/00* | (2006.01) | |
| *F25J 3/02* | (2006.01) | |
| *C10L 3/10* | (2006.01) | |
| *B01D 53/00* | (2006.01) | |
| *B01D 53/04* | (2006.01) | |

(52) U.S. Cl.
CPC ............. *F25J 3/0209* (2013.01); *B01D 53/002* (2013.01); *C10L 3/10* (2013.01); *C10L 3/102* (2013.01);
(Continued)

(58) Field of Classification Search
CPC ... F25J 3/0209; F25J 2280/30; F25J 2220/80; F25J 2220/66; F25J 2250/02; F25J 2220/02; F25J 2220/04; F25J 2220/40; F25J 2220/74; F25J 2205/60; F25J 2205/62; F25J 2205/64; F25J 2205/66; F25J 2205/68; F25J 2205/70; F25J 2205/72; F25J 2205/84; B01D 53/0432
USPC .................................. 62/629, 620, 637, 623
See application file for complete search history.

(56) References Cited

U.S. PATENT DOCUMENTS

| | | | |
|---|---|---|---|
| 2,621,216 A | 12/1952 | White | 260/683.3 |
| 2,843,219 A * | 7/1958 | Habgood | 95/130 |
| 2,863,527 A | 12/1958 | Herbert et al. | 183/115 |
| 2,960,837 A | 11/1960 | Swenson et al. | 62/24 |
| 3,050,950 A | 8/1962 | Karwat et al. | 62/13 |
| 3,109,726 A | 11/1963 | Karwat | 62/13 |

(Continued)

FOREIGN PATENT DOCUMENTS

| | | | |
|---|---|---|---|
| DE | 3149847 | 7/1983 | B01D 5/00 |
| EP | 0133208 | 2/1985 | B01D 53/14 |

(Continued)

OTHER PUBLICATIONS

Haut, R. C. et al. (1989) "Development and Application of the Controlled-Freeze-Zone Process," *SPE Production Engineering*, Aug. 1989, pp. 265-271.

(Continued)

*Primary Examiner* — Marc Norman
*Assistant Examiner* — David Teitelbaum
(74) *Attorney, Agent, or Firm* — ExxonMobil Upstream Research Company—Law Department

(57) ABSTRACT

A system for removing acid gases from a raw gas stream the system includes a cryogenic distillation tower. The tower receives and separates the raw gas stream into an overhead methane stream and a bottom liquefied acid gas stream. Refrigeration equipment downstream of the cryogenic distillation tower cools the overhead methane stream and returns a portion of the overhead methane stream to the cryogenic distillation tower as liquid reflux. The system also may include a first molecular sieve bed upstream of the distillation tower and a second molecular sieve bed downstream of the distillation tower. The first molecular sieve bed adsorbs water while the second molecular sieve bed adsorbs additional acid gases from the cooled overhead methane stream.

31 Claims, 8 Drawing Sheets

(52) U.S. Cl.
CPC .............. *F25J 3/0233* (2013.01); *F25J 3/0266* (2013.01); *B01D 53/04* (2013.01); *B01D 53/0423* (2013.01); *B01D 2253/108* (2013.01); *B01D 2257/304* (2013.01); *B01D 2257/504* (2013.01); *F25J 2200/02* (2013.01); *F25J 2200/74* (2013.01); *F25J 2200/76* (2013.01); *F25J 2200/90* (2013.01); *F25J 2205/04* (2013.01); *F25J 2205/20* (2013.01); *F25J 2205/40* (2013.01); *F25J 2205/60* (2013.01); *F25J 2205/62* (2013.01); *F25J 2205/64* (2013.01); *F25J 2205/66* (2013.01); *F25J 2205/68* (2013.01); *F25J 2205/70* (2013.01); *F25J 2205/72* (2013.01); *F25J 2215/04* (2013.01); *F25J 2220/02* (2013.01); *F25J 2220/04* (2013.01); *F25J 2220/40* (2013.01); *F25J 2220/66* (2013.01); *F25J 2220/68* (2013.01); *F25J 2220/80* (2013.01); *F25J 2240/02* (2013.01); *F25J 2240/30* (2013.01); *F25J 2240/40* (2013.01); *F25J 2250/02* (2013.01); *F25J 2260/80* (2013.01); *F25J 2270/12* (2013.01); *F25J 2280/02* (2013.01); *F25J 2280/30* (2013.01); *F25J 2280/40* (2013.01); *F25J 2290/40* (2013.01); *F25J 2290/72* (2013.01)

(56) References Cited

U.S. PATENT DOCUMENTS

| | | | | |
|---|---|---|---|---|
| 3,349,571 | A | 10/1967 | Nebgen | 62/23 |
| 3,393,527 | A | 7/1968 | Swensen et al. | 62/16 |
| 3,400,512 | A | 9/1968 | McKay | 55/69 |
| 3,421,984 | A * | 1/1969 | William et al. | 203/41 |
| 3,683,634 | A * | 8/1972 | Streich | 62/629 |
| 3,705,625 | A | 12/1972 | Whitten et al. | 166/252 |
| 3,767,766 | A | 10/1973 | Tjoa et al. | 423/220 |
| 3,824,080 | A | 7/1974 | Smith et al. | 23/288 |
| 3,842,615 | A | 10/1974 | Reigel et al. | 62/171 |
| 3,848,427 | A | 11/1974 | Loofbourow | 62/260 |
| 3,895,101 | A | 7/1975 | Tsuruta | 423/574 |
| 3,929,635 | A | 12/1975 | Buriks et al. | 210/54 |
| 3,933,001 | A | 1/1976 | Muska | 62/47 |
| 4,246,015 | A | 1/1981 | Styring | 62/12 |
| 4,270,937 | A | 6/1981 | Adler | 62/17 |
| 4,280,559 | A | 7/1981 | Best | 166/303 |
| 4,281,518 | A | 8/1981 | Muller et al. | 62/12 |
| 4,318,723 | A | 3/1982 | Holmes et al. | 62/20 |
| 4,319,964 | A | 3/1982 | Katz et al. | 202/172 |
| 4,336,233 | A | 6/1982 | Appl et al. | 423/228 |
| 4,344,485 | A | 8/1982 | Butler | 166/271 |
| 4,370,156 | A | 1/1983 | Goddin et al. | 62/17 |
| 4,382,912 | A | 5/1983 | Madgavkar et al. | 423/224 |
| 4,383,841 | A | 5/1983 | Ryan et al. | 62/17 |
| 4,405,585 | A | 9/1983 | Sartori et al. | 423/228 |
| 4,417,449 | A | 11/1983 | Hegarty et al. | 62/28 |
| 4,417,909 | A | 11/1983 | Weltmer | 62/12 |
| 4,421,535 | A | 12/1983 | Mehra | 62/17 |
| 4,441,900 | A | 4/1984 | Swallow | 62/29 |
| 4,459,142 | A | 7/1984 | Goddin | 62/17 |
| 4,462,814 | A | 7/1984 | Holmes et al. | 62/17 |
| 4,511,382 | A | 4/1985 | Valencia et al. | 62/20 |
| 4,512,782 | A | 4/1985 | Bauer et al. | 55/48 |
| 4,533,372 | A | 8/1985 | Valencia et al. | 62/12 |
| 4,551,158 | A | 11/1985 | Wagner et al. | 55/46 |
| 4,563,202 | A | 1/1986 | Yao et al. | 62/17 |
| 4,592,766 | A | 6/1986 | Kumman et al. | 62/18 |
| 4,602,477 | A | 7/1986 | Lucadamo | 62/24 |
| 4,609,388 | A | 9/1986 | Adler et al. | 62/12 |
| 4,636,334 | A | 1/1987 | Skinner et al. | 252/377 |
| 4,695,672 | A | 9/1987 | Bunting | 585/867 |
| 4,697,642 | A | 10/1987 | Vogel | 166/263 |
| 4,710,213 | A | 12/1987 | Sapper et al. | 62/28 |
| 4,717,408 | A | 1/1988 | Hopewell | 62/20 |
| 4,720,294 | A | 1/1988 | Lucadamo et al. | 62/31 |
| 4,747,858 | A * | 5/1988 | Gottier | 62/632 |
| 4,761,167 | A | 8/1988 | Nicholas et al. | 62/17 |
| 4,762,543 | A | 8/1988 | Pantermuehl et al. | 62/28 |
| 4,769,054 | A | 9/1988 | Steigman | 62/12 |
| 4,822,393 | A | 4/1989 | Markbreiter et al. | 62/17 |
| 4,831,206 | A | 5/1989 | Zarchy | 585/737 |
| 4,923,493 | A | 5/1990 | Valencia et al. | 62/13 |
| 4,927,498 | A | 5/1990 | Rushmere | 162/168.3 |
| 4,935,043 | A | 6/1990 | Blanc et al. | 62/20 |
| 4,954,220 | A | 9/1990 | Rushmere | 162/168.3 |
| 4,972,676 | A * | 11/1990 | Sakai | 62/657 |
| 4,976,849 | A | 12/1990 | Soldati | 208/351 |
| 5,011,521 | A | 4/1991 | Gottier | 62/11 |
| 5,062,270 | A | 11/1991 | Haut et al. | |
| 5,062,720 | A | 11/1991 | Hall et al. | 384/484 |
| 5,120,338 | A | 6/1992 | Potts, Jr. et al. | 62/12 |
| 5,137,550 | A | 8/1992 | Hegarty et al. | 55/43 |
| 5,152,927 | A | 10/1992 | Rivers | 252/344 |
| 5,233,837 | A | 8/1993 | Callahan | 62/38 |
| 5,240,472 | A * | 8/1993 | Sircar | 95/52 |
| 5,247,087 | A | 9/1993 | Rivers | 544/357 |
| 5,265,428 | A | 11/1993 | Valencia et al. | 62/36 |
| 5,335,504 | A | 8/1994 | Durr et al. | 62/20 |
| 5,345,771 | A * | 9/1994 | Dinsmore | 62/641 |
| 5,567,396 | A | 10/1996 | Perry et al. | 422/190 |
| 5,620,144 | A | 4/1997 | Strock et al. | 239/557 |
| 5,643,460 | A | 7/1997 | Marble et al. | 210/705 |
| 5,700,311 | A | 12/1997 | Spencer | 95/236 |
| 5,720,929 | A | 2/1998 | Minkkinen et al. | 422/190 |
| 5,819,555 | A | 10/1998 | Engdahl | 62/637 |
| 5,820,837 | A | 10/1998 | Marjanovich et al. | 423/220 |
| 5,899,274 | A | 5/1999 | Frauenfeld et al. | 166/401 |
| 5,956,971 | A | 9/1999 | Cole et al. | 62/623 |
| 5,964,985 | A | 10/1999 | Wootten | 201/40 |
| 5,983,663 | A | 11/1999 | Sterner | 62/620 |
| 6,053,007 | A | 4/2000 | Victory et al. | 62/619 |
| 6,082,133 | A | 7/2000 | Barclay et al. | 62/619 |
| 6,082,373 | A | 7/2000 | Sakurai et al. | 134/1 |
| 6,162,262 | A | 12/2000 | Minkkinen et al. | 23/295 |
| 6,223,557 | B1 * | 5/2001 | Cole | 62/613 |
| 6,240,744 | B1 | 6/2001 | Agrawal et al. | 62/643 |
| 6,267,358 | B1 | 7/2001 | Gohara et al. | 261/110 |
| 6,270,557 | B1 | 8/2001 | Millet et al. | 95/96 |
| 6,274,112 | B1 | 8/2001 | Moffett et al. | 423/338 |
| 6,336,334 | B1 | 1/2002 | Minkkinen et al. | 62/123 |
| 6,374,634 | B2 | 4/2002 | Gallarda et al. | 62/620 |
| 6,401,486 | B1 | 6/2002 | Lee et al. | 62/630 |
| 6,416,729 | B1 | 7/2002 | DeBerry et al. | 423/573.1 |
| 6,442,969 | B1 | 9/2002 | Rojey et al. | 62/618 |
| 6,500,982 | B1 * | 12/2002 | Hale et al. | 562/600 |
| 6,505,683 | B2 | 1/2003 | Minkkinen et al. | 166/266 |
| 6,516,631 | B1 | 2/2003 | Trebble | 62/630 |
| 6,517,801 | B2 | 2/2003 | Watson et al. | 423/574.1 |
| 6,539,747 | B2 * | 4/2003 | Minta et al. | 62/620 |
| 6,565,629 | B1 | 5/2003 | Hayashida et al. | 95/211 |
| 6,605,138 | B2 | 8/2003 | Frondorf | 95/160 |
| 6,631,626 | B1 | 10/2003 | Hahn | 62/612 |
| 6,632,266 | B2 | 10/2003 | Thomas et al. | 95/49 |
| 6,662,872 | B2 | 12/2003 | Gutek et al. | 166/272.4 |
| 6,708,759 | B2 | 3/2004 | Leaute et al. | 166/272.4 |
| 6,711,914 | B2 | 3/2004 | Lecomte | 62/625 |
| 6,735,979 | B2 | 5/2004 | Lecomte | 62/611 |
| 6,755,251 | B2 | 6/2004 | Thomas et al. | 166/265 |
| 6,755,965 | B2 | 6/2004 | Pironti et al. | 208/347 |
| 6,818,194 | B2 | 11/2004 | DeBerry et al. | 423/228 |
| 6,946,017 | B2 | 9/2005 | Leppin et al. | 95/139 |
| 6,958,111 | B2 | 10/2005 | Rust et al. | 202/158 |
| 6,962,061 | B2 | 11/2005 | Wilding et al. | 62/613 |
| 7,001,490 | B2 | 2/2006 | Wostbrock et al. | 203/1 |
| 7,004,985 | B2 | 2/2006 | Wallace et al. | 48/198.3 |
| 7,066,986 | B2 | 6/2006 | Haben et al. | 95/99 |
| 7,073,348 | B2 | 7/2006 | Clodic et al. | 62/532 |
| 7,121,115 | B2 | 10/2006 | Lemaire et al. | 62/625 |
| 7,128,150 | B2 | 10/2006 | Thomas et al. | 166/266 |
| 7,128,276 | B2 | 10/2006 | Nilsen et al. | 236/124 |
| 7,152,431 | B2 | 12/2006 | Amin et al. | 62/637 |
| 7,211,128 | B2 * | 5/2007 | Thomas et al. | 95/135 |

(56) References Cited

U.S. PATENT DOCUMENTS

| | | | |
|---|---|---|---|
| 7,211,701 B2 | 5/2007 | Muller et al. | 568/853 |
| 7,219,512 B1 | 5/2007 | Wilding et al. | 62/617 |
| 7,285,225 B2 | 10/2007 | Copeland et al. | 210/785 |
| 7,325,415 B2 | 2/2008 | Amin et al. | 62/541 |
| 7,424,808 B2 | 9/2008 | Mak | 62/625 |
| 7,437,889 B2 | 10/2008 | Roberts et al. | 62/619 |
| 7,442,231 B2 | 10/2008 | Landrum | 95/45 |
| 7,442,233 B2 | 10/2008 | Mitariten | 95/123 |
| 7,493,779 B2 | 2/2009 | Amin | 62/617 |
| 7,536,873 B2 | 5/2009 | Nohlen | 62/644 |
| 7,544,337 B2 | 6/2009 | Ogura et al. | |
| 7,550,064 B2 | 6/2009 | Bassler et al. | 203/29 |
| 7,575,624 B2 | 8/2009 | Cartwright et al. | 95/51 |
| 7,597,746 B2 | 10/2009 | Mak et al. | 95/169 |
| 7,635,408 B2 | 12/2009 | Mak et al. | 95/187 |
| 7,637,984 B2 | 12/2009 | Adamopoulos | 95/45 |
| 7,637,987 B2 | 12/2009 | Mak | 95/160 |
| 7,641,717 B2 | 1/2010 | Gal | 95/187 |
| 7,662,215 B2 | 2/2010 | Sparling et al. | 95/172 |
| 7,691,239 B2 | 4/2010 | Kister et al. | 203/2 |
| 7,722,289 B2 | 5/2010 | Leone et al. | 405/53 |
| 7,729,976 B2 | 6/2010 | Hill et al. | 705/37 |
| 7,770,872 B2 | 8/2010 | Delatour | 261/110 |
| 7,806,965 B2 | 10/2010 | Stinson | 95/187 |
| 7,814,975 B2 | 10/2010 | Hagen et al. | 166/257 |
| 7,879,135 B2 | 2/2011 | Ravikumar et al. | 95/11 |
| 7,901,583 B2 | 3/2011 | McColl et al. | 210/710 |
| 7,955,496 B2 | 6/2011 | Iqbal et al. | 208/129 |
| 8,002,498 B2 | 8/2011 | Leone et al. | 405/53 |
| 8,020,408 B2 | 9/2011 | Howard et al. | 62/646 |
| 8,133,764 B2 | 3/2012 | Dirks et al. | 438/121 |
| 8,303,685 B2 | 11/2012 | Schubert et al. | 95/181 |
| 8,308,849 B2 | 11/2012 | Gal | 95/187 |
| 8,312,738 B2 | 11/2012 | Singh et al. | 62/629 |
| 8,388,832 B2 | 3/2013 | Moffett et al. | 208/390 |
| 8,428,835 B2 | 4/2013 | Habert et al. | 701/54 |
| 8,475,572 B2 | 7/2013 | Prast et al. | 95/269 |
| 8,529,662 B2 | 9/2013 | Kelley et al. | 95/96 |
| 2002/0174687 A1 | 11/2002 | Cai | 65/158 |
| 2002/0189443 A1 | 12/2002 | McGuire | 95/32 |
| 2003/0181772 A1 | 9/2003 | Meyer et al. | 585/324 |
| 2004/0116756 A1* | 6/2004 | Kulprathipanja et al. | 585/24 |
| 2006/0207946 A1 | 9/2006 | McColl et al. | 210/733 |
| 2006/0239879 A1 | 10/2006 | Lallemand et al. | 423/210 |
| 2007/0056711 A1 | 3/2007 | Amin et al. | 62/532 |
| 2007/0144943 A1 | 6/2007 | Lemaire et al. | 208/208 |
| 2007/0277674 A1 | 12/2007 | Hirano et al. | 95/290 |
| 2008/0034789 A1 | 2/2008 | Fieler et al. | 62/623 |
| 2008/0091316 A1 | 4/2008 | Szczublewski | 701/36 |
| 2008/0092549 A1 | 4/2008 | Trainer et al. | 62/640 |
| 2008/0209807 A1 | 9/2008 | Tsangaris et al. | 48/89 |
| 2008/0307827 A1 | 12/2008 | Hino et al. | 62/634 |
| 2009/0023605 A1 | 1/2009 | Lebl et al. | 506/27 |
| 2009/0220406 A1 | 9/2009 | Rahman | 423/437.1 |
| 2010/0011809 A1 | 1/2010 | Mak | 62/620 |
| 2010/0024472 A1 | 2/2010 | Amin et al. | 62/541 |
| 2010/0107687 A1 | 5/2010 | Andrian et al. | 62/620 |
| 2010/0132405 A1 | 6/2010 | Nilsen | 62/611 |
| 2010/0187181 A1 | 7/2010 | Sortwell | 210/726 |
| 2010/0310439 A1 | 12/2010 | Brok et al. | 423/222 |
| 2011/0168019 A1 | 7/2011 | Northrop et al. | 95/186 |
| 2011/0265512 A1 | 11/2011 | Bearden et al. | 62/617 |
| 2012/0031144 A1 | 2/2012 | Northrop et al. | 62/617 |
| 2012/0079852 A1 | 4/2012 | Northrop et al. | 62/620 |
| 2012/0125043 A1 | 5/2012 | Cullinane et al. | 62/620 |
| 2012/0204599 A1 | 8/2012 | Northrop et al. | 62/617 |
| 2013/0074541 A1 | 3/2013 | Kaminsky et al. | 62/601 |
| 2013/0098105 A1 | 4/2013 | Northrop | 62/617 |
| 2014/0137599 A1 | 5/2014 | Oelfke et al. | 62/619 |

FOREIGN PATENT DOCUMENTS

| | | | |
|---|---|---|---|
| EP | 0508244 | 10/1992 | B01D 53/34 |
| EP | 1338557 | 3/2005 | C01B 17/04 |
| JP | S61-02176 | 1/1986 | |
| JP | 2007/330969 | 12/2007 | |
| WO | WO 02/32536 | 4/2002 | B01F 13/00 |
| WO | WO02/39038 | 5/2002 | F25J 3/06 |
| WO | WO 2004/047956 | 6/2004 | B01D 53/14 |
| WO | WO2007/030888 | 3/2007 | F25J 3/08 |
| WO | WO 2008/034789 | 3/2008 | G10K 11/00 |
| WO | WO2008/091316 | 7/2008 | F25J 3/00 |
| WO | WO2008/095258 | 8/2008 | F25J 3/00 |
| WO | WO2008/152030 | 12/2008 | B01D 53/00 |
| WO | WO 2009/023605 | 2/2009 | |
| WO | WO 2009/029353 | 3/2009 | E21B 43/00 |
| WO | WO 2009/087206 | 7/2009 | B01D 53/00 |
| WO | WO2010/003894 | 1/2010 | C10L 3/10 |
| WO | WO2010/006934 | 1/2010 | F25J 3/02 |
| WO | WO2010/023238 | 3/2010 | F25J 3/06 |
| WO | WO2010/034627 | 4/2010 | B01D 53/00 |
| WO | WO2010/052299 | 5/2010 | B01D 53/00 |
| WO | WO2010/079175 | 7/2010 | F25J 3/06 |
| WO | WO2010/079177 | 7/2010 | F25J 3/06 |
| WO | WO 2010/136442 | 12/2010 | B01D 53/00 |
| WO | WO2011/026170 | 3/2011 | C10L 3/10 |
| WO | WO 2011/090553 | 7/2011 | B01D 53/00 |
| WO | WO 2013/095828 | 6/2013 | B01D 53/00 |
| WO | WO 2013/142100 | 9/2013 | B03C 3/00 |

OTHER PUBLICATIONS

European Search Report No. 09162568 dated May 4, 2010, 9 pages.
PCT International Search and Written Opinion dated Mar. 29, 2010, 12 pgs.
Aaron, D. et al. (2005) "Separation of $CO_2$ from Flue Gas: A Review," *Separation Science and Technology*, 40, pp. 321-348.
Amin, R. (2003) "Advanced Mini Natural Gas Liquefier," *LNG Journal*, Mar.-Apr. 2003, pp. 20-23.
Black, S. (2006) "Chilled Ammonia Process for CO2 Capture," *Alstom Position Paper*, Nov. 2006, 6 pgs.
Ciulla, Vincent (2007) "How the Engine Works," About.com, Mar. 21, 2007, [retrieved from the internet on Aug. 17, 2012]. <URL: http://autorepair.about.com/cs/generalinfo/a/aa060500a.html>.
"Cryogenics" *Science Clarified*, May 2, 2006 [retrieved from the internet on Aug. 17, 2012]. <URL: http://www.scienceclarified.com/Co-Di/Cryogenics.html>.
Denton, R. D. et al. (1985) "Integrated Low Temperature Processing of Sour Natural Gas," *Gas Processors Assoc.*, $64^{th}$ Ann. Conv., pp. 92-96.
Guccione, E. (1963) "New Approach to Recovery of Helium from Natural Gas," Chem. Engr., Sep. 30, 1963, pp. 76-78.
Hassan, S. M. N. (2005) "Techno-Economic Study of $CO_2$ Capture Process for Cement Plants," *University of Waterloo—Thesis*.
Haut, R. C. et al. (1988) "Development and Application of the Controlled Freeze Zone Process," *SPE 17757, SPE Gas Tech. Symp.*—Dallas, TX, pp. 435-443.
Haut, R. C. et al. (1988) "Development and Application of the Controlled Freeze Zone Process," *OSEA 88197, $7^{th}$ Offshore So. East Asia Conf.*, Singapore, Feb. 1988, pp. 840-848.
Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.
Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.
Northrop, P. Scott et al. (2004) "Cryogenic Sour Gas Process Attractive for Acid Gas Injection Applications," $83^{rd}$ Ann. Gas Processors Assoc. Convention, New Orleans, LA., pp. 1-8 (XP007912217).
Pagcatipunan, C. et al. (2005) "Maximize the Performance of Spray Nozzle Systems," *CEP Magazine*, Dec. 2005, pp. 38-44.
Reyes, S. C. et al. (1997) "Frequency Modulation Methods for Diffusion and Adsorption Measurements in Porous Solids," *J. Phys. Chem. B*, v.101, pp. 614-622.
Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.

(56) References Cited

OTHER PUBLICATIONS

Spero, C. (2007) "Callide Oxyfuel Project," *CS Energy, cLET Seminar*, Jul. 12, 2007, 9 pages.

Thomas, E. R. et al. (1987) "Conceptual Studies Using the Controlled Freeze Zone (CFZ) Process," *AIChE Summer Nat'l Mtg.*, Aug. 16-19, 1987.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.

Victory, D. J. et al. (1987) "The CFZ Process: Direct Methane-Carbon Dioxide Fractionation," $66^{th}$ *Ann. GPA Convention*, Mar. 16-18, Denver, CO.

Wilson, R.W. et al. (1968) "Helium: Its Extraction and Purification," *Journ. Petrol. Tech.*, v. 20, pp. 341-344.

Scott et al. "Cryogenic Sour Gas Process Attractive for Acid Gas Injection Applications", GPA Annual Conference; p. 1-8 (2004).

\* cited by examiner

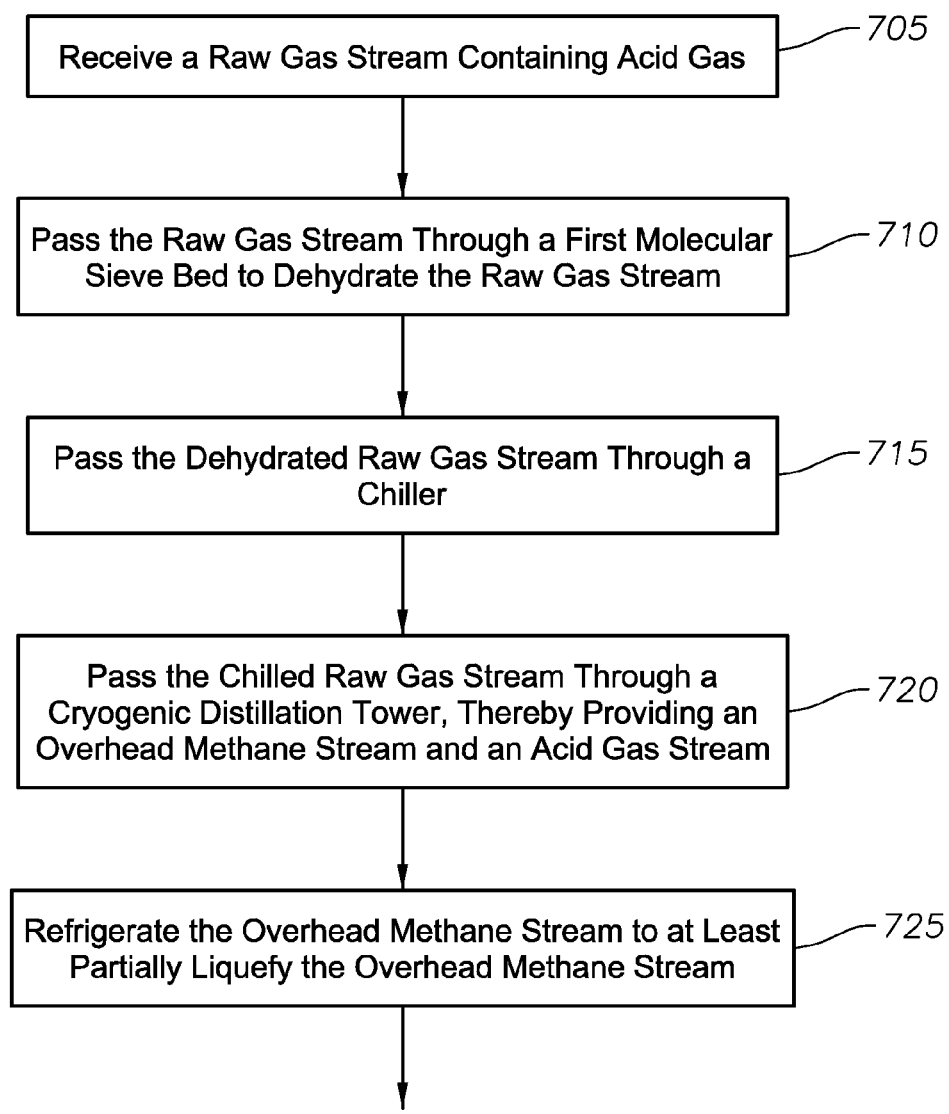

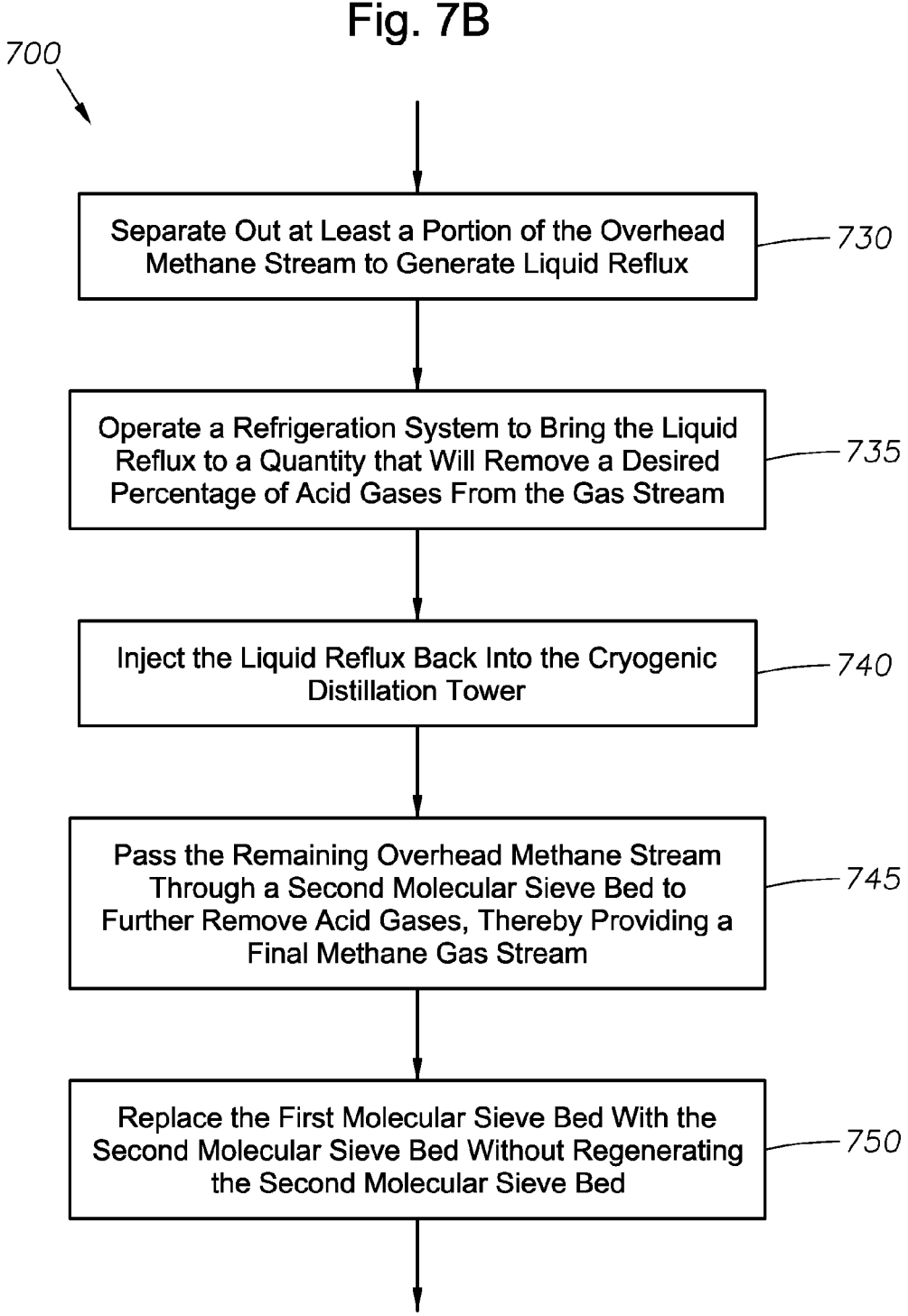

CRYOGENIC SYSTEM FOR REMOVING ACID GASES FROM A HYDROCARBON GAS STREAM, AND METHOD OF REMOVING ACID GASES

CROSS REFERENCE TO RELATED APPLICATIONS

This application is the National Stage of International Application No. PCT/US2010/021785, filed Jan. 22, 2010, claims the benefit of U.S. Provisional Application No. 61/170,919, filed Apr. 20, 2009, which is incorporated herein in its entirety for all purposes.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

1. Field of the Invention

The present invention relates to the field of fluid separation. More specifically, the present invention relates to the separation of carbon dioxide and other acid gases from a hydrocarbon fluid stream.

2. Discussion of Technology

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ and $CO_2$ are produced as part of a hydrocarbon gas stream (such as methane or ethane), the gas stream is sometimes referred to as "sour gas."

Sour gas is usually treated to remove $CO_2$, $H_2S$, and other contaminants before it is sent downstream for further processing or sale. The separation process creates an issue as to the disposal of the separated contaminants. In some cases, the concentrated acid gas (consisting primarily of $H_2S$ and $CO_2$) is sent to a sulfur recovery unit ("SRU"). The SRU converts the $H_2S$ into benign elemental sulfur. However, in some areas (such as the Caspian Sea region), additional elemental sulfur production is undesirable because there is a limited market. Consequently, millions of tons of sulfur have been stored in large, above-ground blocks in some areas of the world, most notably Canada and Kazakhstan.

While the sulfur is stored on land, the carbon dioxide gas is oftentimes vented to the atmosphere. However, the practice of venting $CO_2$ is sometimes undesirable. One proposal to minimizing $CO_2$ emissions is a process called acid gas injection ("AGI"). AGI means that unwanted sour gases are re-injected into a subterranean formation under pressure and sequestered for potential later use. Alternatively, the sour gases are used to create artificial reservoir pressure for enhanced oil recovery operations.

For AGI, it is necessary to have a gas processing facility that separates out the acid gas components from the hydrocarbon gases. However, for "highly sour" streams, that is, production streams containing greater than about 15% $CO_2$ and $H_2S$, it can be particularly challenging to design, construct, and operate a facility that can economically separate contaminants from the desired hydrocarbons. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. In these instances, cryogenic gas processing may be beneficially employed.

Cryogenic gas processing is a distillation process sometimes used for gas separation. Cryogenic gas separation generates a cooled and liquefied gas stream at moderate pressures (e.g., 350-600 pounds per square inch gauge (psig)). In the case of cryogenic distillation of sour gas, liquefied acid gas is generated as a "bottoms" product. Since liquefied acid gas has a relatively high density, hydrostatic head can be beneficially used in an AGI well to assist in the injection process. This means that the energy required to pump the liquefied acid gas into the formation is lower than the energy required to compress low-pressure acid gases to reservoir pressure. Thus, cryogenic gas processing is particularly suitable for AGI.

Challenges also exist with respect to cryogenic distillation of sour gases. When $CO_2$ is present at concentrations greater than about 5 mol. percent in the gas to be processed, it will freeze out as a solid in a standard cryogenic distillation unit. The formation of $CO_2$ as a solid disrupts the cryogenic distillation process. To circumvent this problem, the assignee has previously designed various "Controlled Freeze Zone™" (CFZ™) processes. The CFZ™ process takes advantage of the propensity of carbon dioxide to form solid particles by allowing frozen $CO_2$ particles to form within an open portion of the distillation tower, and then capturing the particles on a melt tray. As a result, a clean methane stream (along with any nitrogen or helium present in the raw gas) is generated at the top of the tower, while a liquid $CO_2$/$H_2S$ stream is generated at the bottom of the tower.

Certain aspects of the CFZ™ process and associated equipment are described in U.S. Pat. Nos. 4,533,372; 4,923,493; 5,062,270; 5,120,338; and 6,053,007.

As generally described in the above U.S. patents, the distillation tower, or column, used for cryogenic gas processing includes a lower distillation zone and an intermediate controlled freezing zone. Preferably, an upper rectification zone is also included. The column operates to create solid $CO_2$ particles by providing a portion of the column having a temperature range below the freezing point of carbon dioxide, but above the boiling temperature of methane at that pressure. More preferably, the controlled freezing zone is operated at a temperature and pressure that permits methane and other light hydrocarbon gases to vaporize, while causing $CO_2$ to form frozen (solid) particles.

As the gas feed stream moves up the column, frozen $CO_2$ particles break out of the feed stream and gravitationally descend from the controlled freezing zone onto a melt tray. There, the particles liquefy. A carbon dioxide-rich liquid stream then flows from the melt tray down to the lower distillation zone at the bottom of the column. The lower distillation zone is maintained at a temperature and pressure at which substantially no carbon dioxide solids are formed, but dissolved methane boils out. In one aspect, a bottom acid gas stream is created at 30° to 40° F.

The controlled freeze zone includes a cold liquid spray. This is a methane-enriched liquid stream known as "reflux." As the vapor stream of light hydrocarbon gases and entrained sour gases moves upward through the column, the vapor stream encounters the liquid spray. The cold liquid spray aids in breaking out solid $CO_2$ particles while permitting methane gas to evaporate and flow upward in the column.

In the upper rectification zone, the methane (or overhead gas) is captured and piped away for sale or made available for fuel. In one aspect, the overhead methane stream is released at about −130° F. The overhead gas may be partially liquefied by additional cooling, and the liquid returned to the column as "reflux." The reflux liquid is injected as the cold spray into the spray section of the controlled freezing zone.

The methane produced in the upper distillation zone meets most specifications for pipeline delivery. For example, the methane can meet a pipeline $CO_2$ specification of less than 2 mol. percent, as well as a 4 ppm $H_2S$ specification, if sufficient reflux is generated. However, more stringent $CO_2$ specifications for natural gas exist for applications such as helium recovery, cryogenic natural gas liquids recovery, conversion to liquid natural gas (LNG), and nitrogen rejection.

The more stringent $CO_2$ specifications may be met by increasing the quantity of liquid methane reflux. This, in turn, requires more and/or larger refrigeration equipment. In this respect, the process of generating cold liquid methane for the spray section requires equipment ancillary to the CFZ tower. This equipment includes pipes, nozzles, compressors, separators, pumps, and expansion valves. The more vigorously the operator wishes to remove $CO_2$, the greater the refrigeration requirements become.

There is a need to reduce the refrigeration requirements of the CFZ process while still reducing the $CO_2$ content down to very low levels. There is also a need for a cryogenic gas separation system and accompanying processes that are augmented by other $CO_2$ removal techniques. Further, there is a need for a cryogenic gas separation process that is able to reduce the $CO_2$ and $H_2S$ content of the gas down to levels acceptable for downstream liquefaction processes without increasing refrigeration equipment capacity.

SUMMARY OF THE INVENTION

A system for removing acid gases from a raw gas stream is provided. In one embodiment, the system includes a cryogenic distillation tower. The distillation tower may have a lower distillation zone and an intermediate controlled freezing zone. The intermediate controlled freezing zone, or spray section, receives a cold liquid spray comprised primarily of methane. The cold spray is a liquid reflux generated from an overhead loop downstream of the distillation tower.

The distillation tower operates to remove acid gases. In this respect, the distillation tower receives and then separates the raw gas stream into an overhead methane stream and a bottom acid gas stream. The system also includes refrigeration equipment. Some of the refrigeration equipment may be used to pre-chill the feed gas, while the remainder of the refrigeration equipment resides downstream of the cryogenic distillation tower for cooling the overhead methane stream. A portion of the overhead methane stream is returned to the cryogenic distillation tower as the liquid reflux.

The distillation tower also includes a solid adsorbent bed downstream of the cryogenic distillation tower. The solid adsorbent bed operates to adsorb at least some remaining acid gases from the cooled overhead methane stream.

In the present system, the refrigeration equipment is designed to generate liquid reflux in a sufficient quantity to remove acid gases from the raw gas stream within the cryogenic distillation tower down to a first selected composition. This means that some percentage or amount of acid gas composition is intentionally released within the overhead methane stream. The overhead methane stream is delivered to the solid adsorbent bed downstream of the cryogenic distillation tower to remove remaining acid gases down to a second lower composition. Thus, the solid adsorbent bed downstream of the cryogenic distillation tower provides post-polishing of the methane stream. It further allows a reduction in refrigeration equipment or capacity that might otherwise need to be devoted to generating liquid reflux.

In one aspect, the acid gases comprise carbon dioxide. The quantity of the generated liquid reflux is sufficient to remove carbon dioxide from the raw gas stream down to a first composition of about 1 to 4 mol. percent. At the same time, the solid adsorbent bed downstream of the cryogenic distillation tower removes additional carbon dioxide from the overhead methane stream down to a second composition. For example, the second composition may be about 0.2 to 3.0 mol. percent.

In another aspect, the quantity of the generated liquid reflux is sufficient to remove carbon dioxide from the raw gas stream down to a first composition that meets pipeline specifications. At the same time, the solid adsorbent bed downstream of the cryogenic distillation tower removes carbon dioxide from the overhead methane stream down to a second composition that meets LNG specifications. For example, the solid adsorbent bed downstream of the cryogenic distillation tower may remove carbon dioxide from the overhead methane stream down to a composition less than about 100 parts per million ("ppm") or, more preferably, down to a composition less than about 50 ppm.

In yet another aspect, the acid gases further comprise hydrogen sulfide. In this instance, the solid adsorbent bed downstream of the cryogenic distillation tower may remove hydrogen sulfide from the overhead methane stream down to a composition less than about 10 ppm or, more preferably, down to a composition less than about 4 ppm.

In one arrangement, at least one solid adsorbent bed downstream of the cryogenic distillation tower is configured to replace at least one solid adsorbent bed upstream of the cryogenic distillation tower in a regeneration cycle.

A method for removing acid gases from a raw gas stream is also provided herein. In one aspect the method includes providing a cryogenic distillation tower. The tower has a lower distillation zone and an intermediate controlled freezing zone that receives a cold liquid spray comprised primarily of methane. The method also includes receiving the raw gas stream into the cryogenic distillation tower.

After receiving the raw gas stream, the method includes separating the raw gas stream in the cryogenic distillation tower into an overhead methane stream and a bottom acid gas stream. The method then includes passing the overhead methane stream through a refrigeration system downstream of the cryogenic distillation tower. The refrigeration system cools the overhead methane stream.

The method further includes returning a first portion of the cooled overhead methane stream to the cryogenic distillation tower as liquid reflux. The liquid reflux serves as the cold liquid spray within the tower. The method also includes passing a second portion of the cooled overhead methane stream through a solid adsorbent bed downstream of the cryogenic distillation tower. This serves to remove additional acid gases and to generate a polished gas stream. Preferably, the solid adsorbent bed is a molecular sieve bed.

The method also includes designing the refrigeration system to produce liquid reflux at a sufficient quantity as to remove acid gases from the raw gas stream within the cryogenic distillation tower down to a first selected composition, and deliver the overhead methane stream to the solid adsorbent bed downstream of the cryogenic distillation tower to remove additional acid gases down to a second lower composition.

In one aspect, the acid gases comprise carbon dioxide. In this instance, the quantity of the generated liquid reflux is sufficient to remove carbon dioxide from the raw gas stream down to a first composition of about 1 to 4 mol. percent. In addition, the solid adsorbent bed downstream of the cryogenic distillation tower removes additional carbon dioxide from the overhead methane stream down to a second composition of about 0.2 to 3.0 mol. percent.

In one arrangement, the quantity of the generated liquid reflux is sufficient to remove carbon dioxide from the raw gas stream down to a first composition that meets pipeline specifications. For example, the pipeline specifications may require a carbon dioxide content that is less than about 3.0 mol. percent. The solid adsorbent bed downstream of the cryogenic distillation tower then removes carbon dioxide from the overhead methane stream down to a second composition that meets LNG specifications. For example, the LNG specifications may require a carbon dioxide content that is less than about 100 ppm or even about 50 ppm.

In another embodiment of the method, the acid gases further comprise hydrogen sulfide. In this instance, the solid adsorbent bed downstream of the cryogenic distillation tower may remove hydrogen sulfide from the overhead methane stream down to a composition less than about 10 ppm. Preferably, the solid adsorbent bed downstream of the cryogenic distillation tower is a molecular sieve bed, and the molecular sieve bed removes hydrogen sulfide from the overhead methane stream down to a composition less than about 4 ppm.

In one aspect, the method further includes the step of at least partially dehydrating the raw gas stream by passing the raw gas stream through a solid adsorbent bed upstream of the cryogenic distillation tower. Preferably, the solid adsorbent bed upstream of the cryogenic distillation tower is also a molecular sieve bed. The method may then further include replacing the molecular sieve bed upstream of the cryogenic distillation tower when the molecular sieve bed upstream of the cryogenic distillation tower becomes substantially saturated with water. When the molecular sieve bed upstream of the cryogenic distillation tower becomes substantially saturated with water, the molecular sieve bed upstream of the cryogenic distillation tower is replaced with a molecular sieve bed that was previously used to adsorb carbon dioxide downstream of the cryogenic distillation tower.

The method may further include regenerating the molecular sieve bed upstream of the cryogenic distillation tower after the molecular sieve bed upstream of the cryogenic distillation tower becomes substantially saturated with water. Regenerating the molecular sieve bed upstream of the cryogenic distillation tower may involve either thermal swing adsorption or pressure swing adsorption. When the molecular sieve bed downstream of the cryogenic distillation tower becomes substantially saturated with carbon dioxide, the molecular sieve bed may be replaced with a regenerated bed previously in service for dehydration upstream of the cryogenic distillation tower.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIGS. 7A, 7B and 7C together present a flowchart for a method of removing acid gases from a gas stream in accordance with the present invention, in one embodiment.

DETAILED DESCRIPTION OF CERTAIN EMBODIMENTS

Definitions

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

The term "mass transfer device" refers to any object that receives fluids to be contacted, and passes those fluids to other objects, such as through gravitational flow. One non-limiting example is a tray for stripping out certain fluids. A grid packing is another example.

As used herein, the term "fluid" refers to gases, liquids, and combinations of gases and liquids, as well as to combinations of gases and solids, and combinations of liquids and solids.

As used herein, the term "condensable hydrocarbons" means those hydrocarbons that condense at about 15° C. and one atmosphere absolute pressure. Condensable hydrocarbons may include, for example, a mixture of hydrocarbons having carbon numbers greater than 4.

As used herein, the term "closed loop refrigeration system" means any refrigeration system wherein an external working fluid such as propane or ethylene is used as a coolant to chill an overhead methane stream. This is in contrast to an "open loop refrigeration system" wherein a portion of the overhead methane stream itself is used as the working fluid.

As used herein, the term "subsurface" refers to geologic strata occurring below the earth's surface.

Description of Specific Embodiments

Figure 1:
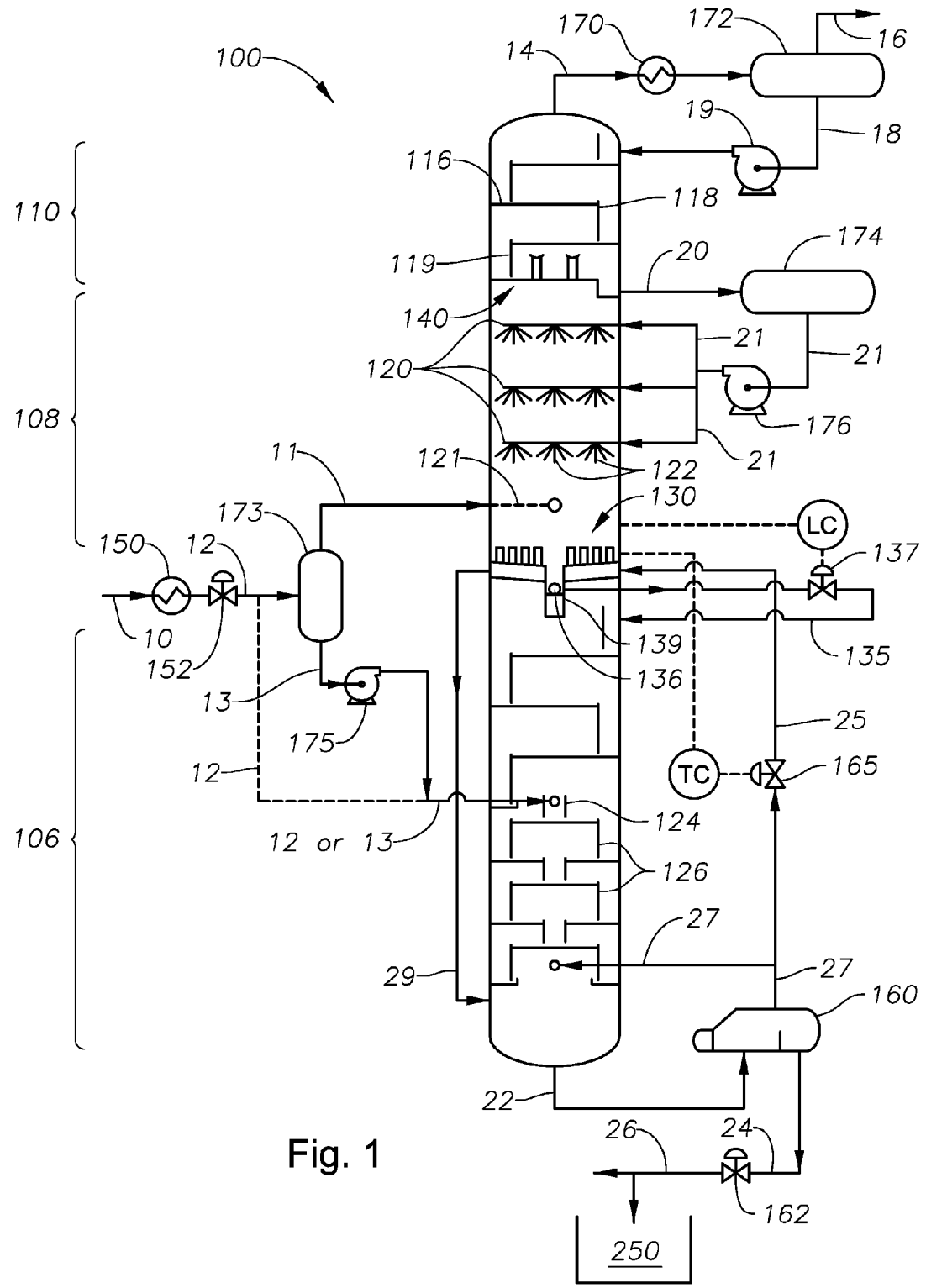
FIG. 1 is a side view of a CFZ distillation tower, in one embodiment. An initial raw gas stream is seen being injected into the intermediate controlled freeze zone of the tower.

FIG. 1 presents a schematic view of a cryogenic distillation tower 100 as may be used in connection with the present inventions, in one embodiment. The cryogenic distillation tower 100 may be interchangeably referred to herein as a "cryogenic distillation tower," a "column," a "CFZ column," or a "splitter tower."

The cryogenic distillation tower 100 of FIG. 1 receives an initial fluid stream 10. The fluid stream 10 is comprised primarily of production gases. Typically, the fluid stream represents a dried gas stream from a wellhead (not shown), and contains about 65% to about 95% methane. However, the fluid stream 10 may contain a lower percentage of methane, such as about 30% to 65%, or even 20% to 30%.

The methane may be present along with trace elements of other light hydrocarbon gases such as ethane. In addition, trace amounts of helium and nitrogen may be present. In the present application, the fluid stream 10 will also include certain contaminants. These are acid gases such as $CO_2$ and $H_2S$.

The initial fluid stream 10 may be at a post-production pressure of approximately 600 pounds per square inch (psi). In some instances, the pressure of the initial fluid stream 10 may be up to about 750 psi or even 1,000 psi.

The fluid stream 10 is typically chilled before entering the distillation tower 100. A heat exchanger 150, such as a shell-and-tube exchanger, is provided for the initial fluid stream 10. A refrigeration unit (not shown) provides cooling fluid (such as liquid propane) to heat exchanger 150 to bring the temperature of the initial fluid stream 10 down to about −30° to −40° F. The chilled fluid stream may then be moved through an expansion device 152. The expansion device 152 may be, for example, a Joule-Thompson ("J-T") valve.

The expansion device 152 serves as an expander to obtain additional cooling of the fluid stream 10. Preferably, partial liquefaction of the fluid stream 10 is also created. A Joule-Thompson (or "J-T") valve is preferred for gas feed streams that are prone to forming solids. The expansion device 152 is preferably mounted close to the cryogenic distillation tower 100 to minimize heat loss in the feed piping.

As an alternative to a J-T valve, the expander device 152 may be a turbo-expander. A turbo-expander provides greater cooling and creates a source of shaft work for processes like the refrigeration unit mentioned above. The refrigeration unit is part of the heat exchanger 150. In this manner, the operator may minimize the overall energy requirements for the distillation process. However, the turbo-expander may not handle frozen particles as well as the J-T valve.

In either instance, the heat exchanger 150 and the expander device 152 convert the raw gas in the initial fluid stream 10 into a chilled fluid stream 12. Preferably, the temperature of the chilled fluid stream 12 is around −40° to −70° F. In one aspect, the cryogenic distillation tower 100 is operated at a pressure of about 550 psi, and the chilled fluid stream 12 is at approximately −62° F. At these conditions, the chilled fluid stream 12 is in a substantially liquid phase, although some vapor phase may inevitably be entrained into the chilled fluid stream 12. Most likely, no solids formation has arisen from the presence of $CO_2$.

The cryogenic distillation tower 100 is divided into three primary sections. These are a lower distillation zone, or "stripping section" 106, an intermediate controlled freezing zone, or "spray section" 108, and an upper distillation section, or "rectification section" 110. In the tower arrangement of FIG. 1, the chilled fluid stream 12 is introduced into the distillation tower 100 the spray section 108. However, the chilled fluid stream 12 may alternatively be introduced into near the top of the stripping section 106.

It is noted in the arrangement of FIG. 1 that the stripping section 106, the intermediate spray section 108, the rectification section 108, and all the components are housed within a single vessel 100. However, for offshore applications in which height of the tower 100 and motion considerations may need to be considered, or for remote locations in which transportation limitations are an issue, the tower 100 may optionally be split into two separate pressure vessels (not shown). For example, the stripping section 106 and the spray section 108 may be located in one vessel, while the rectification section 108 is in another section. External piping would then be used to interconnect the two vessels.

In either embodiment, the temperature of the stripping section 106 is higher than the feed temperature of the chilled fluid stream 12. The temperature of the stripping section 106 is designed to be well above the boiling point of the methane in the chilled fluid stream 12 at the operating pressure of the column 100. In this manner, methane is preferentially stripped from the heavier hydrocarbon and liquid acid gas components. Of course, those of ordinary skill in the art will understand that the liquid within the distillation tower 100 is a mixture, meaning that the liquid will "boil" at some intermediate temperature between pure methane and pure $CO_2$. Further, in the event that there are heavier hydrocarbons present in the mixture, this will increase the boiling temperature of the mixture. These factors become design considerations for the operating temperatures within the distillation tower 100.

In the stripping section 106, the $CO_2$ and any other liquid-phase fluids gravitationally fall towards the bottom of the cryogenic distillation tower 100. At the same time, methane and other vapor-phase fluids break out and rise upwards towards the top of the tower 100. This separation is accomplished primarily through the density differential between the gas and liquid phases. However, the separation process is optionally aided by internal components within the distillation tower 100. As described below, these include a melt tray 130, a plurality of advantageously-configured mass transfer devices 126, and an optional heater line 25. Side reboilers (not shown) may likewise be added to the stripping section 106 to facilitate removal of $CO_2$ and heat transfer.

Referring again to FIG. 1, the chilled fluid stream 12 may be introduced into the column 100 near the top of the stripping section 106. Alternatively, it may be desirable to introduce the feed stream 12 into the intermediate spray section 108 above the melt tray 130. The point of injection of the chilled fluid stream 12 is a design issue dictated by the composition of the initial fluid stream 10.

Where the temperature of the fluid stream 10 is high enough (such as greater than −70° C.) such that solids are not expected, it may be preferable to inject the chilled fluid stream 12 directly into the stripping section 106 through a two-phase flashbox type device (or vapor distributor) 124 in the column 100. The use of a flashbox 124 serves to separate the two-phase vapor-liquid mixture in the chilled fluid stream 12. The flashbox 124 may be slotted such that the two-phase fluid impinges against baffles in the flashbox 124.

If solids are anticipated due to a low inlet temperature, the chilled fluid stream 12 may need to be partially separated in a vessel 173 prior to feeding the column 100 as described above. In this case, the chilled feed stream 12 may be separated in a two phase vessel 173 to minimize the possibility of solids plugging the inlet line and internal components of the column 100. Gas vapor leaves the two phase vessel 173 through a vessel inlet line 11, where it enters the column 100 through an inlet distributor 121. The gas then travels upward through the column 100. A liquid/solid slurry 13 is discharged from the two phase vessel 173. The liquid/solid slurry is directed into the column 100 through the vapor distributor 124 and to the melt tray 130. The liquid/solid slurry 13 can be fed to the column 100 by gravity or by a pump 175.

In either arrangement, that is, with or without the two phase vessel 173, the chilled fluid stream 12 (or 11) enters the column 100. The liquid component leaves the flashbox 124 and travels down a collection of stripping trays 126 within the stripping section 106. The stripping trays 126 include a series of downcomers 129 and weirs 128. These are described more fully below in connection with FIG. 3. The stripping trays 126, in combination with the warmer temperature in the stripping section 106, cause methane and other light gases to break out of solution. The resulting vapor carries the methane and light gases along with carbon dioxide molecules that have boiled off.

The vapor further proceeds upward through risers 131 of the melt tray 130 and into the freeze zone 108. The melt tray risers 131 act as a vapor distributor for uniform distribution through the freeze zone 108. The vapor will then contact cold liquid from spray headers 120 to "freeze out" the $CO_2$. Stated another way, $CO_2$ will freeze and then "snow" back onto the melt tray 130. The solid $CO_2$ then melts and gravitationally flows in liquid form down the melt tray 130 and through the stripping section 106 there below.

As will be discussed more fully below, the spray section 108 is an intermediate freeze zone of the cryogenic distillation tower 100. With the alternate configuration in which the chilled fluid stream 12 is separated in vessel 173 prior to entering the tower 100, the separated liquid/solid slurry 13 is introduced into the tower 100 on to the melt tray 130. Thus, a liquid-solid mixture of sour gas and heavier hydrocarbon components will flow from the distributor 121, with solids and liquids falling down onto the melt tray 130.

The melt tray 130 is configured to gravitationally receive liquid and solid materials, primarily $CO_2$ and $H_2S$, from the intermediate spray section 108. The melt tray 130 serves to warm the liquid and solid materials and direct them downward through the stripping section 106 in liquid form for further purification. The melt tray 130 collects and warms the solid-liquid mixture from the intermediate spray section 108 in a pool of liquid. The melt tray 130 is designed to release vapor flow back to the intermediate spray section 108, to provide adequate heat transfer to melt the solid $CO_2$, and to facilitate liquid/slurry drainage to the lower distillation or stripping section 106 of the column 100 below the melt tray 130.

Figure 2A:
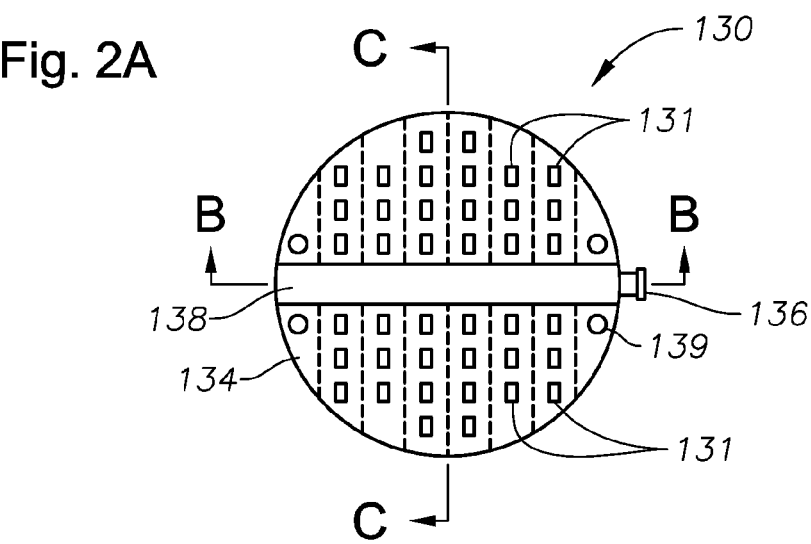
FIG. 2A is a plan view of a melt tray, in one embodiment. The melt tray resides within the tower below the controlled freeze zone.
Figure 2B:
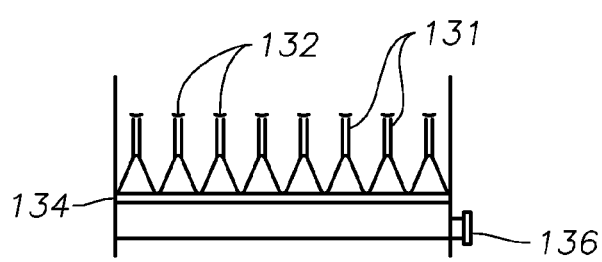
FIG. 2B is a cross-sectional view of the melt tray of FIG. 2A, taken across line 2B-2B.
Figure 2C:
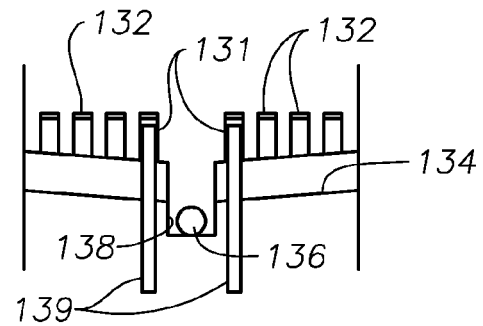
FIG. 2C is a cross-sectional view of the melt tray of FIG. 2A, taken across line 2C-2C.

FIG. 2A provides a plan view of the melt tray 130, in one embodiment. FIG. 2B provides a cross-sectional view of the melt tray 130, taken across line B-B of FIG. 2A. FIG. 2C shows a cross-sectional view of the melt tray 130, taken across line C-C. The melt tray 130 will be described with reference to these three drawings collectively.

First, the melt tray 130 includes a base 134. The base 134 may be a substantially planar body. However, in the preferred embodiment shown in FIGS. 2A, 2B and 2C, the base 134 employs a substantially non-planar profile. The non-planar configuration provides an increased surface area for contacting liquids and solids landing on the melt tray 130 from the intermediate spray section 108. This serves to increase heat transfer from the vapors passing up from the stripping section 106 of the column 100 to the liquids and thawing solids. In one aspect, the base 134 is corrugated. In another aspect, the base 134 is substantially sinusoidal. This aspect of the tray design is shown in FIG. 2B. It is understood that other non-planar geometries may alternatively be used to increase the heat transfer area of the melt tray 130.

The melt tray base 134 is preferably inclined. The incline is demonstrated in the side view of FIG. 2C. Although most solids should be melted, the incline serves to ensure that any unmelted solids in the liquid mixture drain off of the melt tray 130 and into the stripping section 106 there below.

In the view of FIG. 2C, a sump or "downcomer" 138 is seen central to the melt tray 130. The melt tray base 134 slopes inwardly towards the downcomer 138 to deliver the solid-liquid mixture. The base 134 may be sloped in any manner to facilitate gravitational liquid draw-off.

As described in U.S. Pat. No. 4,533,372, the melt tray was referred to as a "chimney tray." This was due to the presence of a single venting chimney. The chimney provided an opening through which vapors may move upward through the chimney tray. However, the presence of a single chimney meant that all gases moving upward through the chimney tray had to egress through the single opening. On the other hand, in the melt tray 130 of FIGS. 2A, 2B and 2C, a plurality of chimneys 131 (or "risers") is provided. The use of multiple chimneys 131 provides improved vapor distribution. This contributes to better heat/mass transfer in the intermediate spray section 108.

The chimneys 131 may be of any profile. For instance, the chimneys 131 may be round, rectangular, or any other shape that allows vapor to pass through the melt tray 130. The chimneys 131 may also be narrow and extend upwards into the intermediate spray section 108. This enables a beneficial pressure drop to distribute the vapor evenly as it rises into the CFZ intermediate spray section 108. The chimneys 131 are preferably located on peaks of the corrugated base 134 to provide additional heat transfer area.

The top openings of the chimneys 131 are preferably covered with hats or caps 132. This minimizes the chance that solids dropping from the spray section 108 can avoid falling onto the melt tray 130. In FIGS. 2A, 2B and 2C, caps 132 are seen above each of the chimneys 131.

The melt tray 130 may also be designed with bubble caps. The bubble caps define convex indentations in the base 134 rising from underneath the melt tray 130. The bubble caps further increase surface area in the melt tray 130 to provide additional heat transfer to the $CO_2$-rich liquid. With this design, a suitable liquid draw off, such as an increased incline angle, should be provided to insure that liquid is directed to the stripping trays 126 below.

Referring again to FIG. 1, the melt tray 130 may also be designed with an external liquid transfer system. The transfer system serves to ensure that all liquid is substantially free of solids and that sufficient heat transfer has been provided. The transfer system first includes a draw-off nozzle 136. In one embodiment, the draw-off nozzle 136 resides within the draw-off sump, or downcomer 138. Fluids collected in downcomer 138 are delivered to a transfer line 135. Flow through transfer line 135 is controlled by a control valve 137 and a level controller "LC" (seen in FIG. 1). Fluids are returned to the stripping section 106 via the transfer line 135. If the liquid level is too high, the control valve 137 opens; if the level is too low, the control valve 137 closes. If the operator chooses not to employ the transfer system in the stripping section 106, then the control valve 137 is closed and fluids are directed immediately to the mass transfer devices, or "stripping trays" 126 below the melt tray 130 for stripping via an overflow downcomer 139.

Whether or not an external transfer system is used, solid $CO_2$ is warmed on the melt tray 130 and converted to a $CO_2$-rich liquid. The melt tray 130 is heated from below by vapors from the stripping section 106. Supplemental heat may optionally be added to the melt tray 130 or just above the melt tray base 134 by various means such as heater line 25. The heater line 25 utilizes thermal energy already available from a bottom reboiler 160 to facilitate thawing of the solids.

The $CO_2$-rich liquid is drawn off from the melt tray 130 under liquid level control and gravitationally introduced to the stripping section 106. As noted, a plurality of stripping trays 126 are provided in the stripping section 106 below the melt tray 130. The stripping trays 126 are preferably in a substantially parallel relation, one above the other. Each of the stripping trays 126 may optionally be positioned at a very slight incline, with a weir such that a liquid level is maintained on the tray. Fluids gravitationally flow along each tray, over the weir, and then flow down onto the next tray via a downcomer.

The stripping trays 126 may be in a variety of arrangements. The stripping trays 126 may be arranged in generally horizontal relation to form a sinusoidal, cascading liquid flow. However, it is preferred that the stripping trays 126 be arranged to create a cascading liquid flow that is divided by separate stripping trays substantially along the same horizontal plane. This is shown in the arrangement of FIG. 3, where the liquid flow is split at least once so that liquid falls into two opposing downcomers 129.

Figure 3:
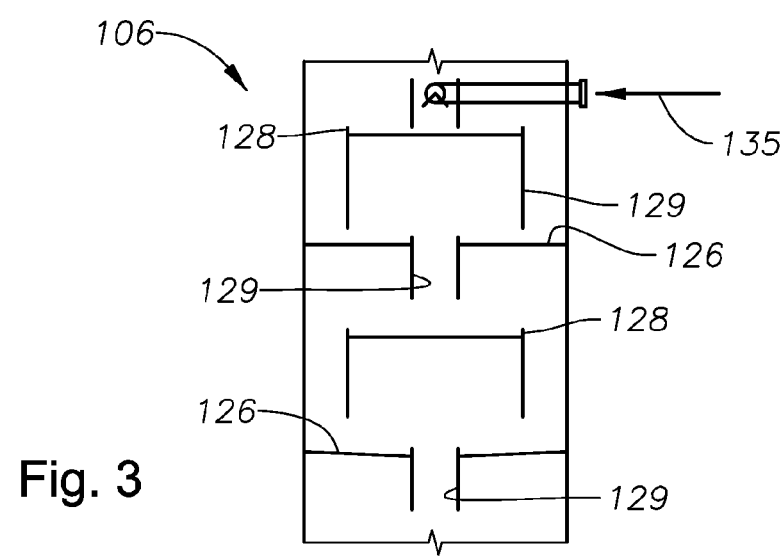
FIG. 3 is an enlarged side view of stripping trays in the lower distillation section of the distillation tower, in one embodiment.

FIG. 3 provides a side view of a stripping tray 126 arrangement, in one embodiment. Each of the stripping trays 126 receives and collects fluids from above. Each stripping tray 126 preferably has a weir 128 that serves as a dam to enable the collection of a small pool of fluid on each of the stripping trays 126. The buildup may be ½ to 1 inch, though any height may be employed. A waterfall effect is created by the weirs 128 as fluid falls from one tray 126 on to a next lower tray 126. In one aspect, no incline is provided to the stripping trays 126, but the waterfall effect is created through a higher weir 128 configuration. The fluid is contacted with upcoming vapor rich in lighter hydrocarbons that strip out the methane from the cross flowing liquid in this "contact area" of the trays 126. The weirs 128 serve to dynamically seal the downcomers 129 to prevent vapor bypassing through the downcomers 129 and to further facilitate the breakout of hydrocarbon gases.

The percentage of methane in the liquid becomes increasingly small as the liquid moves downward through the stripping section 106. The extent of distillation depends on the number of trays 126 in the stripping section 106. In the upper part of the stripping section 106, the methane content of the liquid may be as high as 25 mol percent, while at the bottom stripping tray the methane content may be as low as 0.04 mol percent. The methane content flashes out quickly along the stripping trays 126 (or other mass transfer devices). The number of mass transfer devices used in the stripping section 106 is a matter of design choice based on the composition of the raw gas stream 10. However, only a few levels of stripping trays 126 need be utilized to remove methane to a desired level of 1% or less in the liquefied acid gas, for example.

Various individual stripping tray 126 configurations that facilitate methane breakout may be employed. The stripping tray 126 may simply be a panel with sieve holes or bubble caps. However, to provide further heat transfer to the fluid and to prevent unwanted blockage due to solids, so called "jet trays" may be employed below the melt tray. In lieu of trays, random or structured packing may also be employed.

Figure 4A:
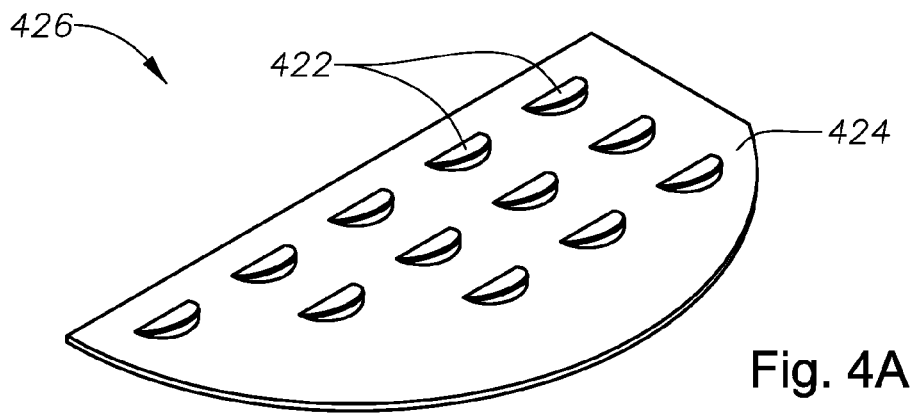
FIG. 4A is perspective view of a jet tray as may be used in either the lower distillation section or in the upper rectification section of the distillation tower, in one embodiment.
Figure 4B:
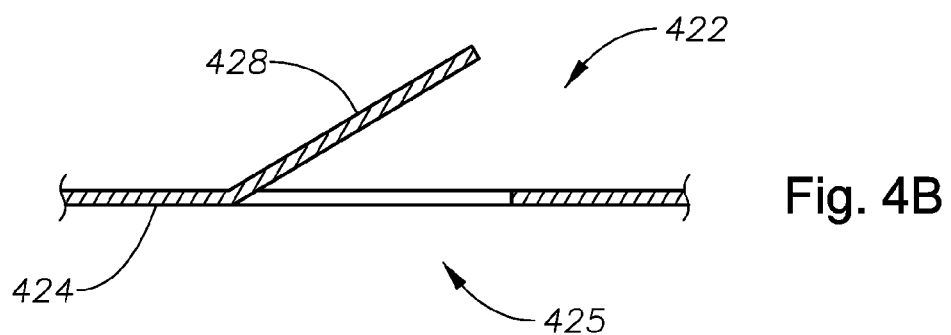
FIG. 4B is a side view of one of the openings in the jet tray of FIG. 4A.

FIG. 4A provides a plan view of an illustrative jet tray 426, in one embodiment. FIG. 4B provides a cross-sectional view of a jet tab 422 from the jet tray 426. As shown, each jet tray 426 has a body 424, with a plurality of jet tabs 422 formed within the body 424. Each jet tab 422 includes an inclined tab member 428 covering an opening 425. Thus, a jet tray 426 has a plurality of small openings 425.

In operation, one or more jet trays 426 may be located in the stripping 106 and/or rectification 110 sections of the tower 100. The trays 426 may be arranged with multiple passes such as the pattern of stripping trays 126 in FIG. 3. However, any tray or packing arrangement may be utilized that facilitates the breakout of methane gas. Fluid cascades down upon each jet tray 426. The fluids then flow along the body 424. The fluid is then contacted with the vapor exiting the openings 425. The tabs 422 are optimally oriented to move the fluid quickly and efficiently across the tray 426. An adjoined downcomer (not shown) may optionally be provided to move the liquid to the subsequent tray 426. The openings 425 also permit gas vapors released during the fluid movement process in the stripping section 106 to travel upwards more efficiently to the melt tray 130 and through the chimneys 131.

In one aspect, the trays 126 or 426 may be fabricated from fouling-resistant materials, that is, materials that prevent solids-buildup. Fouling-resistant materials are utilized in some processing equipment to prevent the buildup of metal particles, polymers, salts, hydrates, catalyst fines, or other chemical solids compounds. In the case of the cryogenic distillation tower 100, fouling resistant materials may be used in the trays 126 or 426 to limit sticking of $CO_2$ solids. For example, a Teflon™ coating may be applied to the surface of the trays 126 or 426.

Alternatively, a physical design may be provided to ensure that the $CO_2$ does not start to build up in solid form along the inner diameter of the column 100. In this respect, the jet tabs 422 may be oriented to push liquid along the wall of the column 100, thereby preventing solids accumulation along the wall of the column 100 and ensuring good vapor-liquid contact.

In any of the tray arrangements, as the down-flowing liquid hits the stripping trays 126, separation of components occurs. Methane gas breaks out of solution and moves upward in vapor form. The $CO_2$, however, is cold enough and in high enough concentration that it remains in its liquid form and travels down to the bottom of the stripping section 106. The liquid is then moved out of the cryogenic distillation tower 100 in an exit line as an exit fluid stream 22.

Upon exiting the distillation tower 100, the exit fluid stream 22 enters a reboiler 160. In FIG. 1, the reboiler 160 is a kettle type that provides reboiled vapor to the bottom of the stripping trays. A reboiled vapor line is seen at 27. In addition, reboiled vapor may be delivered through a heater line 25 to provide supplemental heat to the melt tray 130. The supplemental heat is controlled through a valve 165 and temperature controller TC. Alternately, a heat exchanger, such as a thermosyphon heat exchanger (not shown) may be used for the initial fluid stream 10 to economize energy. In this respect, the liquids entering the reboiler 160 remain at a relatively low temperature, for example, about 30° to 40° F. By heat integrating with the initial fluid stream 10, the operator may warm the cold exit fluid stream 22 from the distillation tower 100 while cooling the production fluid stream 10. For this case, the fluid providing supplemental heat through line 25 is a mixed phase return from the reboiler 160.

It is contemplated that under some conditions, the melt tray 130 may operate without heater line 25. In these instances, the melt tray 130 may be designed with an internal heating feature such as an electric heater. However, it is preferred that a heat system be offered that employs the heat energy available in exit fluid stream 22. The warm fluids in heater line 25 after exiting reboiler 160 exist in one aspect at 30° to 40° F., so they contain relative heat energy. Thus, in FIG. 1, vapor stream 25 is shown being directed to the melt tray 130 through a heating coil (not shown) on the melt tray 130. The vapor stream 25 may alternatively be tied to the transfer line 135.

In operation, the reboiled vapor stream is introduced at the bottom of the column through line 27, above the bottom liquid level and below the last stripping tray 126. As the reboiled vapor passes through each tray 126, residual methane is stripped out of the liquid. This vapor cools off as it travels up the tower. By the time the stripping vapors of stream 27 reach the corrugated melt tray 130, the temperature may have dropped to about −20° F. to 0° F. However, this remains quite warm compared to the melting solid on the melt tray 130, which may be around −50° F. to −80° F. The vapor still has enough enthalpy to melt the solids $CO_2$ as it comes in contact with the melt tray 130 to warm the melt tray 130.

Referring back to reboiler 160, fluids in a bottom stream 24 that exit the reboiler 160 in liquid form may optionally pass through an expander valve 162. The expander valve 162 reduces the pressure of the bottom liquid product, effectively providing a refrigeration effect. Thus, a chilled bottom stream 26 is provided. This also creates hydrostatic head. In this respect, the $CO_2$-rich liquid exiting the reboiler 160 may be pumped downhole through one or more AGI wells (seen schematically at 250 in FIG. 1). In some situations, the liquid $CO_2$ may be pumped into a partially recovered oil reservoir as part of an enhanced oil recovery process. Thus, the $CO_2$ could be a miscible injectant. As an alternative, the $CO_2$ may be used as a miscible flood agent for enhanced oil recovery.

Referring again to the stripping section 106 of the column 100, gas moves up through the stripping section 106, through the chimneys 131 in the melt tray 130, and into the intermediate spray section 108. The spray section 108 is an open chamber having a plurality of spray nozzles 122. As the vapor moves upward through the spray section 108, the temperature of the vapor becomes much colder. The vapor is contacted by liquid methane coming from the spray nozzles 122. This liquid methane is colder than the upwardly-moving vapor, having been chilled by an external refrigeration unit 170. In one arrangement, the liquid methane exists from spray nozzles 122 at a temperature of approximately −120° F. to −130° F. However, as the liquid methane evaporates, it absorbs heat from its surroundings, thereby reducing the temperature of the upwardly-moving vapor. The vaporized methane also flows upward due to its reduced density (relative to liquid methane) and the pressure gradient within the column 100.

As the methane vapors move further up the cryogenic distillation tower 100, they leave the intermediate spray section 108 and enter the rectification section 110. The vapors continue to move upward along with other light gases broken out from the original chilled fluid stream 12. The combined hydrocarbon vapors move out of the top of the cryogenic distillation tower 100, becoming an overhead methane stream 14.

The hydrocarbon gas in the overhead methane stream 14 is moved into the external refrigeration unit 170. In one aspect, the refrigeration unit 170 uses an ethylene refrigerant or other refrigerant capable of chilling the overhead methane stream 14 down to −135° to −45° F. This serves to at least partially liquefy the overhead methane stream 14. The chilled methane stream 14 is then moved to a reflux condenser or separation chamber 172.

Separation chamber 172 is used to separate gas 16 from liquid reflux 18. The gas 16 represents the lighter hydrocarbon gases, primarily methane, from the original raw gas stream 10. Nitrogen and helium may also be present. The methane gas 16 is, of course, the "product" ultimately sought to be captured and sold commercially, along with any ethane.

A portion of the overhead methane stream 14 exiting the refrigeration unit 170 remains condensed. This portion becomes liquid reflux 18 that is separated in the separation chamber 172 and returned to the column 100. A pump 19 may be used to move the liquid reflux 18 back into the column 100. Alternatively, the separation chamber 172 is mounted above the column 100 to provide a gravity feed of the liquid reflux 18. The liquid reflux 18 will include any carbon dioxide that escaped from the upper rectification section 110. However, most of the reflux liquid 18 is methane, typically 95% or more, with nitrogen (if present in the initial fluid stream 10) and traces of carbon dioxide and hydrogen sulfide (also if present in the initial fluid stream 10).

In one cooling arrangement, the overhead methane stream 14 is taken through an open-loop refrigeration system, such as the refrigeration system shown in and described in connection with FIG. 6. In this arrangement, the overhead methane stream 14 is taken through a cross-exchanger to chill a return portion of the overhead methane stream used as the liquid reflux 18. Thereafter, the overhead methane stream 14 is pressurized to about 1,000 psi to 1,400 psi, and then cooled using ambient air and possibly an external propane refrigerant. The pressurized and chilled gas stream is then directed through an expander for further cooling. A turbo expander may be used to recover even more liquid as well as some shaft work. U.S. Pat. No. 6,053,007 entitled "Process For Separating a Multi-Component Gas Stream Containing at Least One Freezable Component," describes the cooling of an overhead methane stream, and is incorporated herein in its entirety by reference.

It is understood here that the present inventions are not limited by the cooling method for the overhead methane stream 14. It is also understood that the degree of cooling between refrigeration unit 170 and the initial refrigeration unit 150 may be varied. In some instances, it may be desirable to operate the refrigeration unit 150 at a higher temperature, but then be more aggressive with cooling the overhead methane stream 14 in the refrigeration unit 170. Again, the present inventions are not limited to these types of design choices.

Returning to FIG. 1, the reflux liquid 18 is returned into the rectification section 110. The reflux liquid 18 is then gravitationally carried through one or more mass transfer devices 116 in the rectification section 110. In one embodiment, the mass transfer devices 116 are rectification trays that provide a cascading series of weirs 118 and downcomers 119, similar to trays 126 described above.

As fluids from reflux liquid stream 18 move downward through the rectification trays 116, additional methane vaporizes out of the rectification section 110. The methane gases rejoin the overhead methane stream 14 to become part of the gas product stream 16. However, the remaining liquid phase of reflux liquid 18 falls onto a collector tray 140. As it does so, the reflux liquid stream 18 unavoidably will pick up a small percentage of hydrocarbon and residual acid gases moving upward from the spray section 108. The liquid mixture of methane and carbon dioxide is collected at collector tray 140.

Figure 5:
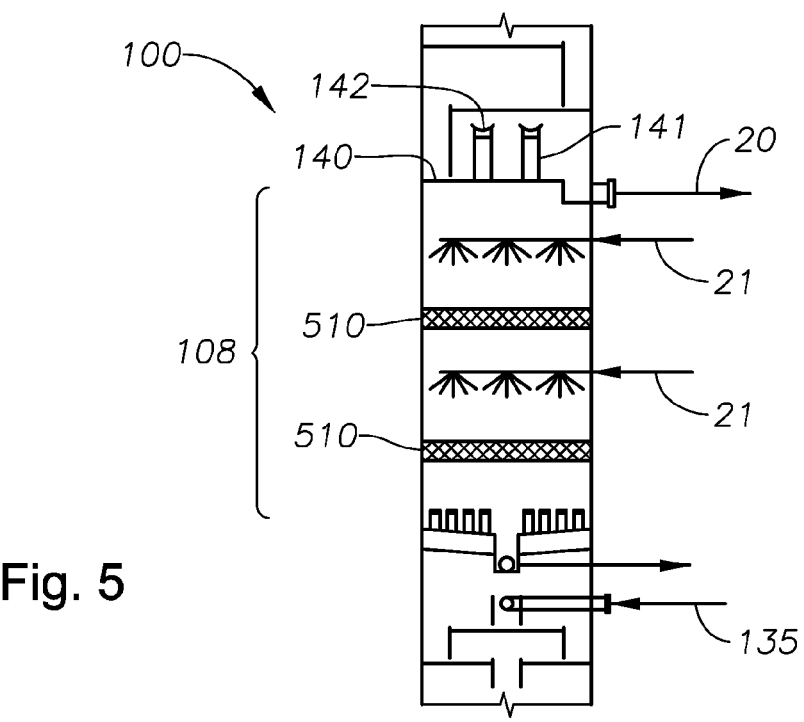
FIG. 5 is a side view of the intermediate controlled freeze zone of the distillation tower of FIG. 1. In this view, two illustrative baffles have been added to the intermediate controlled freeze zone.

The collector tray 140 preferably defines a substantially planar body for collecting liquids. However, as with melt tray 130, collector tray 140 also has one, and preferably a plurality of chimneys for venting gases coming up from the spray section 108. A chimney and cap arrangement such as that presented by components 131 and 132 in FIGS. 2B and 2C may be used. Chimneys 141 and caps 142 for collector tray 140 are shown in the enlarged view of FIG. 5, discussed further below.

It is noted here that in the rectification section 110, any $H_2S$ present has a preference towards being dissolved in the liquid versus being in the gas at the processing temperature. In this respect, the $H_2S$ has a comparatively low relative volatility. By contacting the remaining vapor with more liquid, the cryogenic distillation tower 100 drives the $H_2S$ concentration down to within the desired parts-per-million (ppm) limit, such as a 10 or even 4 ppm specification. As fluid moves through the mass transfer devices 116 in the rectification section 110, the $H_2S$ contacts the liquid methane and is pulled out of the vapor phase and becomes a part of the liquid stream 20. From there, the $H_2S$ moves in liquid form downward through the stripping section 106 and ultimately exits the cryogenic distillation tower 100 as part of the liquefied acid gas stream 22.

In cryogenic distillation tower 100, the liquid captured at collector tray 140 is drawn out of the rectification section 110 as a liquid stream 20. The liquid stream 20 is comprised primarily of methane. In one aspect, the liquid stream 20 is comprised of about 93 mol. percent methane, 3% $CO_2$, 0.5% $H_2S$, and 3.5% $N_2$, At this point, the liquid stream 20 is at about −125° F. to −130° F. This is only slightly warmer than the reflux fluid stream 18. The liquid stream 20 is directed into a reflux drum 174. The purpose of the reflux drum 174 is to provide surge capacity for a pump 176. Upon exiting the reflux drum 174, a spray stream 21 is created. Spray stream 21 is pressurized in a pump 176 for a second reintroduction into the cryogenic distillation tower 100. In this instance, the spray stream 21 is pumped into the intermediate spray section 108 and emitted through nozzles 122.

Some portion of the spray stream 21, particularly the methane, vaporizes and evaporates upon exiting the nozzles 122. From there, the methane rises through the intermediate spray section 108, through the chimneys in the collector tray 140, and through the mass transfer devices 116 in the rectification section 110. The methane leaves the distillation tower 100 as the overhead methane stream 14 and ultimately become commercial product in gas stream 16.

The spray stream 21 from the nozzles 122 also causes carbon dioxide to desublime from the gas phase. In this respect, some $CO_2$ momentarily enters the gas phase and moves upward with the methane. However, because of the cold temperature within the intermediate spray section 108, the gaseous carbon dioxide quickly turns into a solid phase and begins to "snow." This phenomenon is referred to as desublimation. In this way, some $CO_2$ never re-enters the liquid phase until it hits the melt tray 130. This carbon dioxide "snows" upon the melt tray 130, and melts into the liquid phase. From there, the $CO_2$-rich liquid cascades down the mass transfer devices or trays 126 in the stripping section 106, along with liquid $CO_2$ from the chilled fluid stream 12 as described above. At that point, any remaining methane from the spray stream 21 of the nozzles 122 should quickly break out into vapor. These vapors move upwards in the cryogenic distillation tower 100 and re-enter the rectification section 110.

It is desirable to have chilled liquid contacting as much of the gas that is moving up the column as possible. If vapor bypasses the spray stream 21 emanating from the nozzles 122, higher levels of $CO_2$ could reach the rectification section 110 of the tower 100. To improve the efficiency of gas/liquid contact in the intermediate spray section 108, a plurality of nozzles 122 having a designed configuration may be employed. Thus, rather than employing a single spray source at one or more levels in a reflux fluid stream 21, several spray headers 120 optionally designed with multiple spray nozzles 122 may be used. Thus, the configuration of the spray nozzles 122 has an impact on the mass transfer taking place within the intermediate spray section 108.

The assignee herein has previously proposed various nozzle arrangements in co-pending WO Pat. Publ. No. 2008/091316 having an international filing date of Nov. 20, 2007. That application and FIGS. 6A and 6B are incorporated herein by reference for teachings of the nozzle configurations. The nozzles seek to ensure 360° and full radial coverage within the spray section 108 and provide good vapor-liquid contact and heat/mass transfer. This, in turn, more effectively chills any gaseous carbon dioxide moving upward through the cryogenic distillation tower 100.

The use of multiple headers 120 and a corresponding overlapping nozzle 122 arrangement for complete coverage minimizes back-mixing as well. In this respect, complete coverage prevents the fine, low-mass $CO_2$ particles from moving back up the column and re-entering the rectification section 110. These particles would then remix with methane and re-enter the overhead methane stream 14, only to be recycled again.

It can be seen that the process of cycling vapors through the cryogenic distillation tower 100 ultimately produces a hydrocarbon product comprised of a commercial methane product 16. The gas product 16 is sent down a pipeline for sale. The gas product stream 16 preferably meets a pipeline $CO_2$ specification of 1 to 4 mol. percent, as well as a 4 ppm $H_2S$ specification, if sufficient reflux is generated. At the same time, acid gases are removed through exit fluid stream 22.

Should nitrogen be present in quantities of, for example, greater than 3 mol. percent, a separate nitrogen rejection process may be used. Pipeline specifications generally require a total inert gas composition of less than 3 mol. percent. One option for removing excessive nitrogen is to use a solid adsorbent bed (not shown). The solid adsorbent may be a zeolite material that forms a molecular sieve having a selected pore size. The molecular sieve is placed along the overhead methane stream to remove nitrogen from the overhead stream. Preferably, this occurs prior to chilling.

Once this molecular sieve is fully adsorbed with nitrogen, it may be regenerated using either pressure swing adsorption or thermal swing adsorption. The molecular sieve generally cannot be regenerated using water adsorption upstream of the cryogenic tower as the nitrogen will end up back in the column and, thus, is not eliminated from the system.

While the above system described in connection with FIG. 1 is beneficial for producing a substantially acid-free pipeline gas product 16, it is acknowledged that in some applications, supplemental refrigeration may be required. For example, LNG specifications can be as low as 50 ppm for $CO_2$. Using the system described above, significant reflux refrigeration from external refrigeration unit 170 (or other refrigeration system) is required. In addition, additional refrigeration may be required prior to reflux injection from pump 19 or pump 176. Still further, significant heat removal may be needed from the initial heat exchanger 150 to partially liquefy the feed stream 10. These refrigerators demand capacity for liquid reflux generation and energy for horsepower.

As an alternative, a "polishing" process is proposed herein. The "polishing" is applied to the overhead methane stream 14 as a post-CFZ process. This means that the overhead methane stream 14 released from the cryogenic distillation tower 100 is further polished downstream of the tower 100 to meet, for example, liquefied natural gas (LNG) specifications without increasing the quantity of liquid reflux injected through the spray nozzles 122.

Figure 6:
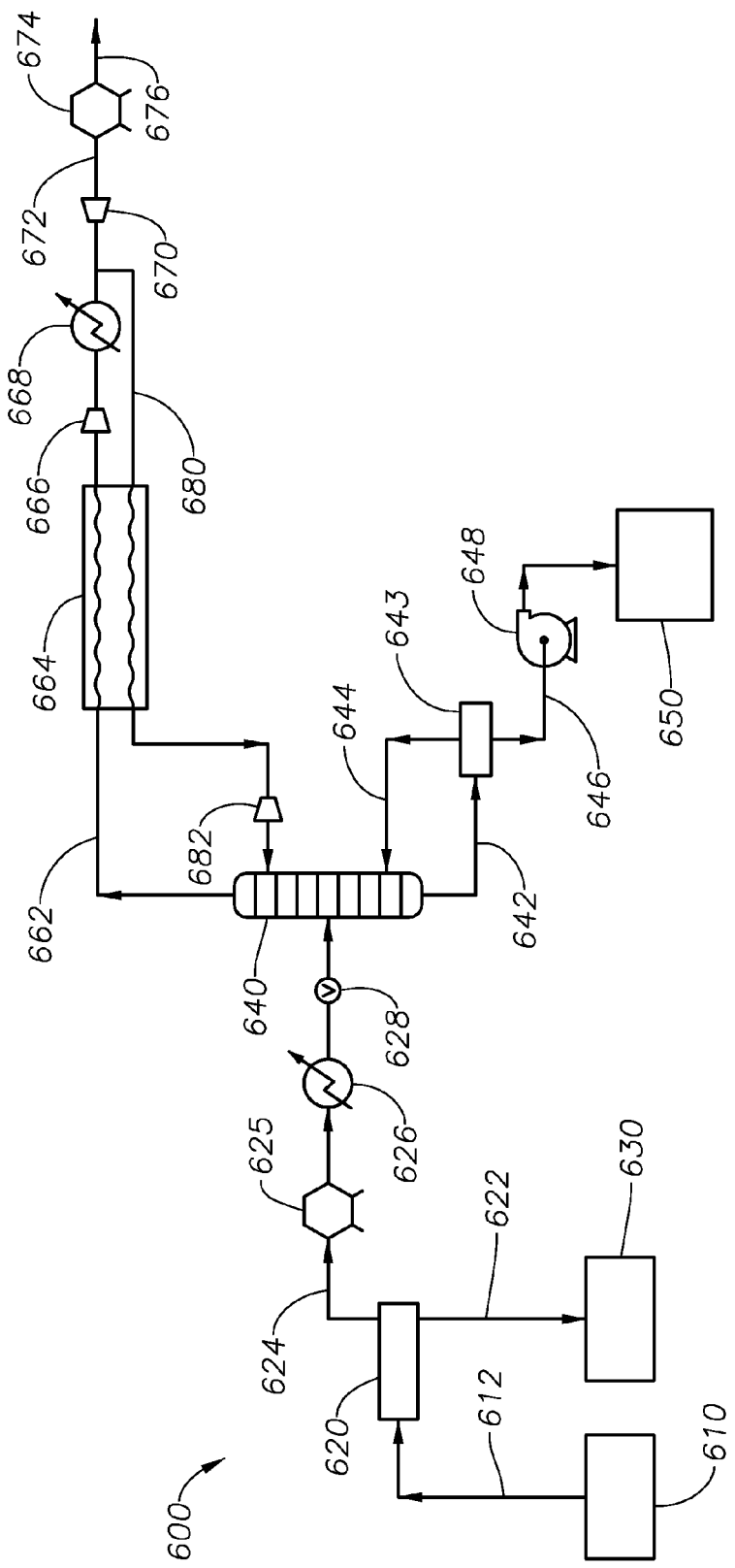
FIG. 6 is a schematic diagram showing a gas processing facility for removing acid gases from a gas stream in accordance with the present invention, in one embodiment.

FIG. 6 is a schematic diagram showing a gas processing facility 600 for removing acid gases from a gas stream, in one embodiment. A production gas stream is shown at 612. The gas stream 612 originates from hydrocarbon production activities that take place in a reservoir development area or "field" 610.

It is understood that the field 610 may represent any location where compressible hydrocarbons are produced. The field 610 may be onshore, near shore or offshore. The field 610 may be operating from original reservoir pressure or may be undergoing enhanced recovery procedures. The systems and methods claimed herein are not limited to the type of field that is under development so long as it is producing compressible hydrocarbons contaminated with acid gas.

The production gas stream 612 may be directed through a dehydration process such as a glycol dehydration process. A dehydration vessel is shown schematically at 620. As a result of passing the production gas stream 612 through the dehydration vessel 620, a stream of removed water 622 is generated. The water 622 may be sent to a water treatment facility. Alternatively, the water 622 may be re-injected into a subsurface formation, indicated at block 630. Alternatively still, the water may be treated and then injected back into the subsurface formation 630 associated with field 610.

Also, as a result of passing the production gas stream 612 through the dehydration vessel 620, a substantially dehydrated raw gas stream 624 is produced. The raw gas stream 624 preferably contains methane and, possibly, trace amounts of ethane, nitrogen, helium and other light gases.

The raw gas stream 624 may be passed through a pipeline, for example, from an offshore treating facility to an onshore treating facility. The gas may then be passed through a solid adsorbent bed 625 to further dehydrate the gas in the gas stream 624. Removing water from the raw gas stream 624 helps ensure that neither hydrates nor ice form in the subsequent chilling or cryogenic facilities.

The solid adsorbent bed 625 may be a molecular sieve bed. A "molecular sieve" refers to a material containing tiny pores of a precise and substantially uniform size. In the present context, such sieves are used as an adsorbent for gases and/or liquids. Molecular sieves often consist of solid materials and not polymeric materials. Exemplary materials include alumino-silicate minerals, clays, porous glasses, micro-porous charcoals, zeolites, active carbons, or synthetic compounds that have open structures through which small molecules, such as nitrogen and water, can diffuse. Polar molecules (such as water molecules) that are small enough to pass into the pores are adsorbed, while slightly polarizable molecules (such as methane and nitrogen), as well as larger molecules (e.g., propane and butane) flow around the particles and crystallites, and are thus passed downstream. In the present case, the molecular sieve bed 625 adsorbs water molecules and allows light gases to pass through.

The raw gas stream 624 next passes through a refrigeration unit 626. The refrigeration unit 626 chills the dehydrated raw gas stream 624 down to a temperature of about –30° F. to –40° F. The refrigeration unit 626 may be, for example, an ethylene or a propane refrigerator.

The raw gas stream 624 is next preferably moved through an expansion device 628. The expansion device 628 may be, for example, a Joule-Thompson ("J-T") valve. The expansion device 628 serves as an expander to obtain further cooling of the raw gas stream 624. The expansion device 628 further reduces the temperature of the dehydrated raw gas stream 624 down to, for example, about –70° F. to –80° F. Preferably, at least partial liquefaction of the gas stream 624 is also accomplished.

The chilled raw gas stream 624 next enters a cryogenic distillation tower 640. The cryogenic distillation tower may be any tower that operates to distill methane from acid gases through a process that intentionally freezes $CO_2$ particles. The cryogenic distillation tower may be, for example, tower 100 of FIG. 1. The chilled raw gas stream 624 enters the vessel at about 500 to 600 psig.

The distillation tower 640 includes a lower stripping section (seen as section 106 in FIG. 1). The distillation tower 640 also includes a controlled freezing zone (seen as section 108 in FIG. 1) where vapor is contacted with cold reflux liquid (primarily methane). This causes $CO_2$ to freeze out of the gas phase. The remaining methane and other gas phase components vaporize and rise upward towards an upper rectification section (seen as section 110 of FIG. 1). There, residual $H_2S$ and $CO_2$ are further removed from the gas phase. In one aspect (not seen), a "split tower" is used in which the rectification section 110 is in a separate vessel from the stripping section 106 and the controlled freezing zone 108.

As explained in connection with FIG. 1, the acid gases are removed from the distillation tower 640 as a bottom liquefied acid gas stream 642. This liquid stream 642 may optionally be sent through a reboiler 643 where gas containing trace amounts of methane is redirected back into the tower as gas stream 644. The remaining liquid comprised primarily of acid gases is released through acid gas line 646. The liquefied acid gas in line 646 may be vaporized, depressured, and then sent to a sulfur recovery unit (not shown). Alternatively, the liquefied acid gas may be injected into a subsurface formation through one or more acid gas injection (AGI) wells as indicated by block 650. In this instance, the acid gas in line 646 is preferably passed through a pressure booster 648.

Methane is released from the distillation tower 640 as an overhead methane stream 662. The overhead methane stream 662 will preferably comprise no more than about 2% carbon dioxide. At this percentage, the overhead methane stream 662 may be used as fuel gas or may be sold into certain markets as natural gas. However, in accordance with certain methods herein, it is desirable that the overhead methane stream 662 undergo further processing.

As indicated above, the overhead methane stream 662 is passed through an open loop refrigeration system. First, the overhead methane stream 662 is passed through a heat exchanger 664. This serves to pre-cool a reflux stream 680 that is reintroduced into the cryogenic distillation tower 640. The overhead methane stream 662 is then sent through a compressor 666 to increase its pressure.

Next, the pressurized methane stream 662, heated by compression, is cooled. This may be done through, for example, passing the methane stream 662 through an aerial cooler 668. A cool and pressurized methane stream is produced.

A part of the cooled and pressurized methane stream leaving the cooler 668 is split into a reflux stream 680. The reflux stream 680 is further cooled in cross-exchanger 664, then expanded through device 682 to generate liquid reflux stream 684. The liquid reflux stream 684 enters the distillation tower 640 where it is used as reflux, and ultimately in the sprays to freeze out $CO_2$ and other acid gas particles from the dehydrated gas stream 624. Sufficient reflux is generated such that a $CO_2$ or $H_2S$ specification is partially met at the top of the tower 640. The liquid reflux stream 684 from expander 682 may be injected directly into the spray nozzles in the controlled freezing zone. More preferably, the liquid reflux stream 684 is first routed to the rectification section of the distillation tower 640 in order to further reduce the $CO_2$ concentration in the overhead gas. In either instance, the chilled reflux stream 680 preferably passes through an expansion valve or turboexpander 682 to generate liquid.

Returning to the overhead methane stream 662, the overhead methane stream 662 may be passed through one or more expansion valves or turboexpanders. An expansion valve is shown at 670 in FIG. 6. The expansion valve or (turboexpander) 670 decreases the pressure of the gas stream 662 and cools it further in preparation of liquefaction to generate LNG. A cooled gas stream 672 is thus created.

It is understood that specifications for liquefied natural gas, or LNG, may require that the acid gas concentration be lower than 2 mol. percent. LNG-specifications typically permit no more than 50 ppm $CO_2$ and 4 ppm $H_2S$. Accordingly, in accordance with the present methods, the pre-LNG stream 672 is sent to a solid adsorbent bed 674 as a post-processor for further acid gas removal. Preferably, the solid adsorbent bed 674 is a molecular sieve bed. Certain molecular sieves such as 4-Angstrom and 5-Angstrom beds can be used to remove $CO_2$ as well as $H_2O$ from a methane gas stream. Mercaptans may also be removed. The overhead methane stream 672 is at high pressure and relatively cool, which helps facilitate the adsorption of $CO_2$ on the solid adsorbent bed 674.

The solid adsorbent bed 674 may be a molecular sieve bed that employs pressure swing adsorption. Pressure swing adsorption, or PSA, refers to a process wherein a contaminant is adsorbed onto a solid adsorbent, then removed from the adsorbent by decreasing the pressure. In the case of acid gas removal, $CO_2$ may be removed from a sour gas. In one aspect, the pressure swing adsorption bed is a rapid-cycle, pressure swing adsorption, or RCPSA, bed. An RCPSA vessel is particularly advantageous as it is compact relative to a standard PSA device. PSA's are used for a variety of gas separations, for example, for removal of impurities from hydrogen streams in refinery service. Such systems are manufactured, for example, by QuestAir of British Columbia, Canada.

The solid adsorbent used in a molecular sieve bed may be fabricated from any one of several materials. Preferably, zeolites are used. Zeolites are crystalline materials composed of silicon and aluminum. Alternatively, the post-processor may be a vessel that uses an adsorbent that relies on the rate at which certain species are adsorbed relative to other species. This is known as adsorptive kinetic separation (AKS). After $CO_2$ saturation, the zeolite or other bed material may be regenerated or cleaned. This may be done, for example, by lowering pressure on the bed and releasing acid gases, or by passing a hot gas through it. The hot gas may be, for example, a hot methane gas or heated nitrogen. The hot methane gas may be captured and then used as process fuel such as for operating refrigeration equipment, assuming that the $H_2S$ content is sufficiently low.

Molecular sieve beds are ideal for post-processing inasmuch as the overhead methane stream 662 is already quite clean. No additional pretreatment is required for reaching an LNG-specification gas stream 672. Further, there is no need for a sacrificial layer of material in the packed bed.

In lieu of a molecular sieve bed, other types of post-processors (not shown) may also be employed in connection with the gas processing system 600. For example, one or more vessels that applies chemical solvents to absorb acid gases may be used. Alternatively, the post-processor may be one or more vessels that apply physical solvents or ionic solvents to remove residual $CO_2$. An advantage to these solvents is that they are not aqueous-based, so no further dehydration should be required of the overhead methane stream 662. Of course, the addition of a solvent-based system as the post-processor will add significantly to the equipment count and is therefore not preferred.

It can be seen that the post-processor allows for optimization of a cryogenic acid gas removal system by trading reduced liquid reflux (that is, reducing refrigeration capacity and horsepower) with a downstream molecular sieve bed 674 or other post-processor to pick up additional $CO_2$, as well as $H_2S$. Thus, the overhead methane stream 662 may exceed a 50 ppm LNG specification for LNG, and a 4 ppm $H_2S$ specification for LNG, knowing that the downstream post-processor 674, e.g., molecular sieve bed, will remove additional acid gas to bring the final gas product into compliance with specifications.

In whatever form, the post-processor generates a final sales gas stream 676. The final sales gas stream is suitable for a downstream liquefaction process, ultimately resulting in the sale of liquefied natural gas, or LNG.

Figure 7C:
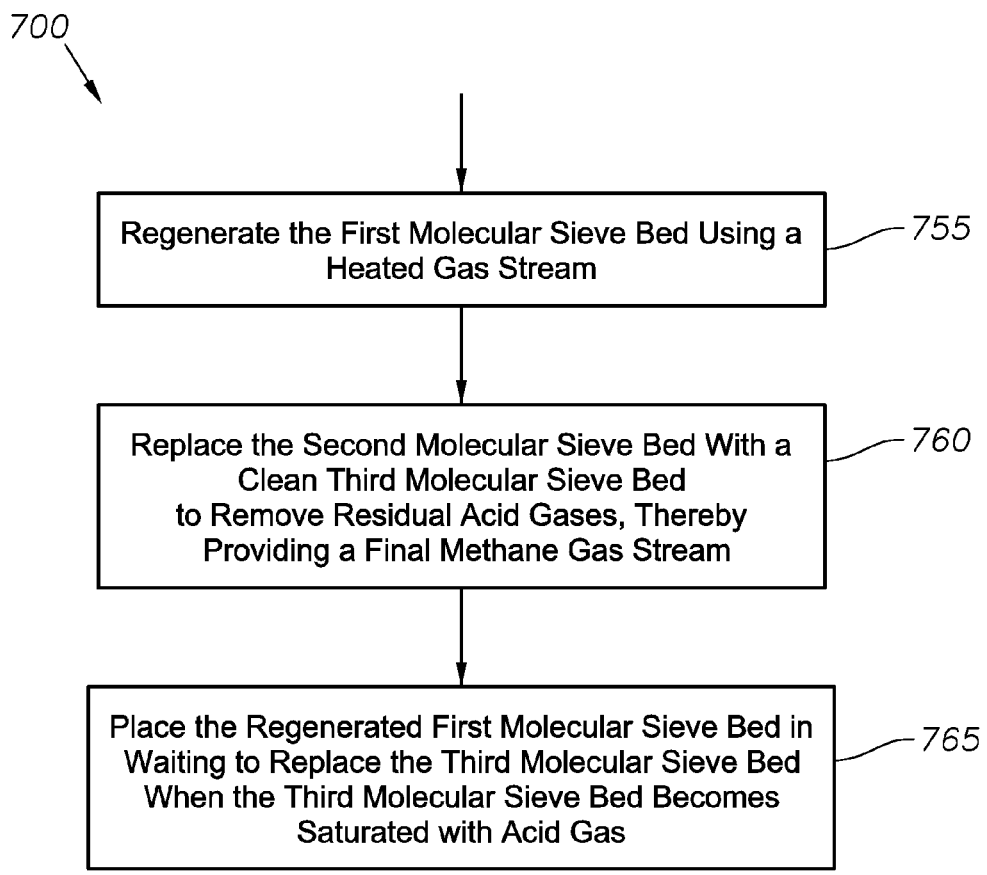

FIGS. 7A, 7B and 7C together present a flow chart. The flow chart presents a method 700 for removing acid gases from a raw gas stream using an acid gas removal system in accordance with the present inventions, in one embodiment.

The method 700 first includes receiving a raw gas stream. This step is shown at Box 705. The raw gas stream is received as a result of hydrocarbon producing activities. Stated another way, the raw gas stream has been produced from a subsurface reservoir and brought to the surface for processing.

In accordance with the method 700, the raw gas stream contains compressible hydrocarbons. These primarily represent methane. However, trace amounts of ethane, nitrogen, helium and other light gases may also be present. The raw gas stream further contains acid gases. The acid gases may comprise carbon dioxide, hydrogen sulfide, mercaptans, or other contaminants. The acid gas content of the raw gas stream may represent, for example, anywhere from about 5 to 60 mol. percent of the total gas stream.

In its produced form, the raw gas stream most likely also contains water or brine. Therefore, as part of the method 700 the raw gas stream is taken through a dehydration process. In one aspect, the raw gas stream is optionally passed through a first molecular sieve bed. This step is shown at Box 710.

In the present application, the molecular sieve bed adsorbs water molecules from the raw gas stream. Thus, the molecular sieve bed in step 710 acts as a desiccant. Molecular sieve beds for adsorbing water are available from various sources such as Texas Technologies, Inc. of Cedar Park, Tex. and Eurecat U.S. of Houston, Tex.

After dehydration, the raw gas stream may be passed through a refrigeration system. This step is shown at Box 715. This may be done, for example, by moving the gas stream through a chiller such as refrigeration unit 150 of FIG. 1. This may optionally be followed by passing the raw gas stream through an expander such as expansion device 152. The expander provides further cooling of the raw gas stream.

In accordance with the method 700, the raw gas stream is next scrubbed of acid gases. This is accomplished by passing the raw gas stream through a cryogenic distillation tower. The step of passing the raw gas stream through a cryogenic distillation tower is shown in Box 720.

The cryogenic distillation tower may be any tower that operates to distill methane or other light hydrocarbon gases from acid gases through a process that involves intentionally freezing $CO_2$ particles. The cryogenic distillation tower may be, for example, tower 100 of FIG. 1. The frozen $CO_2$ particles are preferably collected on a melt tray at the bottom of the spray section of the distillation tower. As the particles melt and turn to liquid, the liquid may cascade down through a series of trays or downcomers. This causes additional methane to break out of solution and to move upward through the tower as a vapor, as described above. The remaining $CO_2$-enriched liquid is then captured as a bottom liquefied acid gas stream including any hydrogen sulfide.

As a result of processing the raw gas stream through the cryogenic distillation tower, an overhead methane stream is produced. The overhead methane stream will preferably comprise no more than 5 mol. percent and, more preferably, no more than about 2 mol. percent carbon dioxide.

The method 700 next includes refrigerating the overhead methane stream. The step of refrigerating the overhead methane stream is shown in Box 725 of FIG. 7A. The purpose of cooling the overhead methane stream is to at least partially liquefy the methane therein.

The overhead methane stream is cooled using a refrigeration system. The system may be, for example, an external, closed-loop refrigeration unit such as an ethylene or propane refrigeration unit 170 in FIG. 1. Another example of a closed loop refrigeration system is a series of propane and ethylene-cascaded chillers. Alternatively, the refrigeration system may be an open loop refrigeration system such as any of the open loop refrigeration systems shown in U.S. Pat. No. 6,053,007. In one aspect, an open loop refrigeration system is used wherein the overhead methane stream 14 takes heat from the returning liquid stream through a heat-exchanger, and is then compressed. The compressed gas is then cooled to near ambient temperatures using aerial coolers or, possibly, a seawater cooler. The gas may be further cooled to sub-ambient temperatures using a propane chiller, for example. An open loop refrigeration system is shown in and described in connection with FIG. 6.

The method 700 next includes separating out at least a portion of the overhead methane stream to generate liquid reflux. This step is provided in Box 730 of FIG. 7B. The process of separating out part of the overhead methane stream is preferably done after the methane stream has been at least partially liquefied. In another aspect, the partially liquefied overhead methane stream (such as stream 14) is carried through a separator (such as reflux condenser or separator 172). The separator creates a gas stream 16 and a liquid stream 18. Some or all of the liquid stream 18 is reintroduced into the tower 100 as the liquid reflux.

In connection with refrigerating the overhead methane stream, and as implied above, a refrigeration system is operated. The step of operating the refrigeration system is shown at Box 735. One purpose for operating the refrigeration system is to generate a quantity of liquid reflux that will remove a desired percentage of the acid gases from the raw gas stream. Those of ordinary skill in the art will understand that a correlation exists between the quantity of the liquid reflux injected back into the cryogenic distillation tower and the efficiency with which carbon dioxide solids are precipitated out of the vapor stream within the cryogenic distillation tower. The more vigorously the liquid methane is refrigerated and the greater the quantity of liquid reflux 18 is generated, the more effective the cryogenic distillation tower will precipitate out carbon dioxide and other acid gases. However, refrigeration equipment is expensive, and the lower the temperature of the liquid reflux and the more liquid reflux generated, the more energy and equipment are required.

Under step 735, the operator or process designer intentionally does not generate so much liquid reflux as to remove all of the acid gases. Stated another way, a quantity of liquid reflux is set to remove most but not all of the carbon dioxide. For example, the quantity of the liquid reflux may be set to bring the carbon dioxide content of the raw gas stream down to about 2 to 5 mol. percent. Alternatively, the temperature of the liquid reflux may be set to bring the carbon dioxide content down to pipeline specifications. It is understood that the temperature will be set by the operating pressure. More specifically, temperature is set based upon an optimization between operating pressure, the number of trays in the upper distillation section, or "rectification section," and the amount of reflux liquid used. In any event, energy otherwise required of the refrigeration system to bring the overhead methane stream into LNG specifications is conserved.

In one embodiment of the method 700, sufficient refrigeration is provided in step 735 to provide a quantity of liquid reflux that will remove carbon dioxide from the overhead methane stream down to a percentage of about 0.5 to 2.0 mol. percent. This represents a first selected composition. Thereafter, the post-processor removes carbon dioxide from the overhead methane stream down to a level of about 50 to 200 ppm. This represents a second selected composition.

In one potential embodiment, CFZ refrigeration is minimized by utilizing only enough liquid reflux (generated by either external refrigeration, or via the open-loop process, or from an LNG plant) to freeze the inlet concentration of $CO_2$ down to about 2% $CO_2$ at the top of the spray section. The post-processor then removes additional $CO_2$ below 2% to, for example, LNG requirements. Thus, the refrigeration step 735 provides a trade-off of refrigeration requirements with molecular sieve equipment during normal operations.

The method 700 next includes injecting at least a portion of the liquid reflux back into the cryogenic distillation tower. This step is shown at Box 740 of FIG. 7B. The step 740 of injecting liquid reflux into the cryogenic distillation tower is presented, for example, through line 21 of FIG. 1 and line 680 of FIG. 6. The purpose for injecting the liquid reflux back into the cryogenic distillation tower is to provide very cold fluid within the tower that causes carbon dioxide to precipitate out of methane vapor as a solid.

In one aspect, the separated liquid reflux 18 drops down through trays and ultimately becomes cold liquid spray 21. In another embodiment, the portion of the overhead methane stream that becomes liquid reflux may be directly injected into the distillation tower such as through liquid line 680 from gas processing system 600. In either instance, the liquid stream 21 or 680 preferably undergoes pressure boosting, such as through booster 176 of FIG. 1.

In one arrangement, the liquid methane is re-injected into the column 640 at a temperature of, for example, about $-120°$ F. to $-140°$ F. However, the operating conditions under which an acid gas component of the raw gas stream will freeze out is a function of a number of variables. These include, for example, the raw gas stream composition, the chemical character of the freezable acid gas component, and the separation system's temperature and pressure. Beneficially, the solid forming conditions for any freezable component of the raw gas stream may be determined through the use of commercially available process simulation software.

Next, the portion of the overhead methane stream that is not separated out as liquid reflux is passed through a non-cryogenic post-processor. This step is shown in Box 745. The purpose of passing the remaining overhead methane stream through the molecular sieve bed 674 is to further remove acid gases. The result is a final gas stream that has less than about 200 ppm carbon dioxide. More preferably, the $CO_2$ content is less than about 50 ppm.

In one aspect, the carbon dioxide content meets pipeline specifications. Alternatively, the carbon dioxide content meets liquefied natural gas (LNG) standards, that is, less than 50 ppm $CO_2$ and less than about 4 ppm $H_2S$. The LNG may be imported from another country and offloaded in the United States at an import terminal.

The non-cryogenic post-processor may be one of a number of different types of vessels or acid gas removal systems for removing carbon dioxide from a methane gas stream. Preferably, the pre-processor is a molecular sieve bed. The molecular sieve bed may be, for example, a 4-Angstrom or a 5-Angstrom bed that is capable of removing carbon dioxide from a methane gas stream. However, the post-processor may alternatively be one or more vessels that employs chemical solvents to strip acid gas from the methane stream. Alternatively, the post-processor may be one or more vessels that contacts ionic liquids or physical solvents with the methane to remove residual carbon dioxide.

When a molecular sieve bed is used as the post-processor, it is preferably introduced to the acid gas removal system in a substantially clean state. During the course of operation the sieve bed becomes saturated with carbon dioxide. Of interest, in the present method 700, the molecular sieve bed that has become saturated with carbon dioxide may serve as a second molecular sieve bed to replace the first molecular sieve bed from step 710. This takes place when the first molecular sieve bed has become saturated with water. The step of replacing the first molecular sieve bed with the second molecular sieve bed is demonstrated in Box 750.

It is noted that a molecular sieve bed will preferentially displace carbon dioxide by adsorbing water vapor. This is because water is more strongly adsorbed than $CO_2$. Consequently, water vapor will displace or desorb $CO_2$ that has been previously adsorbed on a molecular sieve bed. This means that the second molecular sieve bed (saturated with adsorbed carbon dioxide) may be installed as the first molecular sieve bed for dehydration purposes, without undergoing a prior regeneration process. The second molecular sieve bed will now dehydrate the raw gas stream and pass displaced carbon dioxide into the cryogenic distillation tower. Since the amount of $CO_2$ released from the second molecular sieve bed into the tower is relatively small, the distillation tower can process it with little or no loss in capacity. Thus, an inherent synergy is created between molecular sieve beds used upstream and downstream with the method 700.

It is understood that the first molecular sieve bed from step 710 that has now become saturated with water must undergo a dedicated regeneration process. The regeneration step is indicated at Box 755 in FIG. 7C. Regeneration of a hydrated sieve bed typically involves directing a heated gas through and across the molecular sieve bed. The heated gas may be methane gas from, for example, sales gas stream 676, or heated nitrogen. Thereafter, the molecular sieve bed is cooled and set aside for later service. In the present method 700, later service means $CO_2$ removal downstream of the distillation tower, e.g., a post-processor or post-polishing bed.

The method 700 may also include the step of replacing the second molecular sieve bed (used downstream of the cryogenic distillation tower) with a third molecular sieve bed. This step is shown at Box 760. The third molecular sieve bed may be a new sieve bed. Alternatively, the third molecular sieve bed may be a bed that has been regenerated from a previous service, such as a bed regenerated from step 755.

It is understood that the rate of saturation for a molecular sieve bed may be different when adsorbing water than when adsorbing acid gases such as $CO_2$ and $H_2S$. The rate of saturation for any molecular sieve bed depends on such variables as the fluid flow rates, the respective concentrations of contaminants within the fluids, and the capacity for adsorbing the different contaminants. In the present context, this means that the first molecular sieve bed (which adsorbs primarily water in connection with step 710), and the second molecular sieve bed (which adsorbs primarily $CO_2$ in connection with step 740), may not become saturated at the same time. In general, a molecular sieve bed's capacity is substantially lower for $H_2S$ and $CO_2$ than for water vapor. However, there may be a greater quantity of water than $CO_2$, for example. In any case, more than two molecular sieve beds are to be included in a rotation for continuous operation.

In one mode of operation, three molecular sieve beds are placed into service. One bed would be in dehydration service; another would be in post-polishing service; and a third bed would be undergoing regeneration. Regeneration would, of course, include heating, followed by cooling, followed by placement in standby mode. This process of using three molecular sieve beds advantageously compares with the known use of a minimum of four sieve beds wherein the dehydration and polishing services are kept separate.

FIG. 7C shows a step 765 of placing the regenerated first molecular sieve bed in waiting to replace the third molecular sieve bed. Replacement takes place when the third molecular sieve bed becomes saturated with carbon dioxide, or when some subsequent replacement sieve bed becomes saturated with carbon dioxide. Alternatively, replacement may be driven by saturation of the sorbent bed in desiccation service.

In one aspect, four molecular sieve beds are employed in a rotation. A first sieve bed is employed for $CO_2$ removal service for the overhead methane stream. A second sieve bed, which was previously in $CO_2$ removal service for the overhead gas, is now in dehydration service for the raw gas stream. The third sieve bed is being regenerated. This is typically done by heating the third bed with a purge gas. The purge gas is usually passed through the third bed in a counter-flow direction at a lower pressure. The fourth bed is in cool-down mode after having been in regeneration. Cooling is typically done by flowing a cool gas across the fourth bed. The fourth molecular sieve bed will be switched to $CO_2$-removal service as soon as the first sieve bed is substantially saturated with carbon dioxide. In this way the rotation continues.

In connection with the method 700 for removing acid gases from a raw gas stream, the cycle times related to steps 750 and 760 may be set. The operator should have an understanding as to how long it takes the solid adsorbent bed upstream of the distillation tower to become hydrated, that is, saturated with water, and how long it takes the solid adsorbent bed downstream of the distillation tower to become saturated with $CO_2$. The cycle times should be set to prevent a "breakthrough" of water or acid gases from the respective beds, even in the most extreme feed conditions. This means that some part of the respective beds may not be fully utilized for adsorption.

It is also noted that material such as zeolite that is used in solid adsorbent beds tends to become less active or less adsorptive over time. The adsorptive material will be more effective at the start of a run ("SOR") than at the end of a run ("EOR"). This means that the solid adsorbent beds may need to be cycled more frequently as time goes on. Thus, in one aspect, cycle times related to steps 750 and 760 are progressively shortened.

Fixed cycle-time control is applicable whether the solid adsorbent bed (such as dehydration bed 625) is a molecular sieve bed or a pressure swing adsorption bed. It is understood that for pressure swing adsorption processes, cycle times will be much shorter. For example, cycle times for pressure swing adsorption beds tend to be on the order of minutes or even seconds rather than hours.

It is preferred that the cycle times be controlled through a control system. Thus, in one aspect the gas processing system 600 includes a control system. The control system may, for example, control regeneration of the solid adsorbent bed 625 used for dehydration to ensure that measurable "breakthrough" of water does not occur during the dehydration process. The control may be done based on fixed time schedules. For example, the second bed described above may be in dehydration service for 12 hours, while the third bed undergoes regeneration for 6 hours. The fourth bed may undergo cooling for three hours, and then be placed in standby for three hours. The regenerated and cooled fourth bed is then put into service while the first bed is taken out of service and put into dehydration service.

Figure 8A:
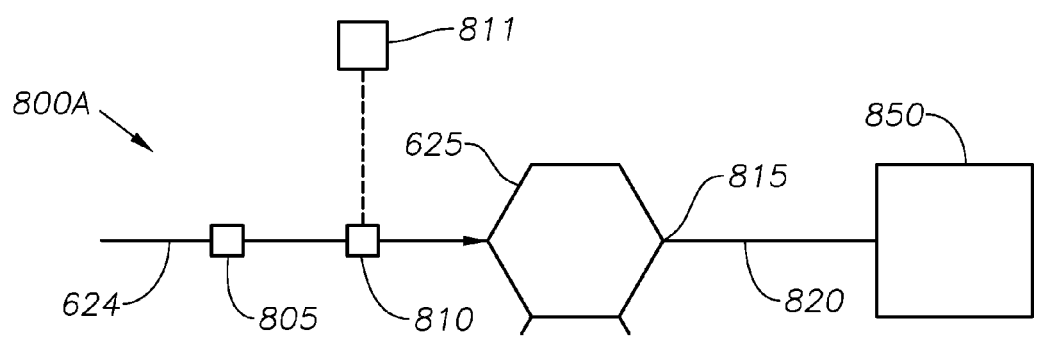
FIG. 8A is a schematic diagram of a control system that uses feed-forward control. The illustrative control system is used to control cycle times for a solid adsorbent upstream of a cryogenic gas processing system.

In one aspect, the control system employs a "feed-forward" control scheme. FIG. 8A provides a schematic diagram of a control system 800A that uses feed-forward control. In FIG. 8A, the solid adsorbent bed 625 from system 600 used for dehydration is seen. In addition, the partially dehydrated raw gas stream 624 is indicated. The raw gas stream 624 is being directed into the bed 625 for further dehydration. The raw gas stream 624 is ultimately processed in an acid gas removal system having a cryogenic distillation tower. An acid gas removal system is shown schematically at 850 receiving a further dehydrated acid gas stream 820 from the bed 625.

The control system 800A may first include a flow meter 805. The flow meter 805 is placed along the raw gas stream 624. The flow meter 805 measures the flow rate of the raw gas stream 624 into the solid adsorbent bed 625. The control system 800A also includes a measurement device 810. The measurement device 810 is used to measure the concentration of water in the raw gas stream 624. The measurement device 810 may be, for example, one where the change in dielectric constant of alumina is measured as a function of the moisture adsorbed thereon. Note that the measurement device 810 is optional. In this respect, the concentration of water vapor may be known indirectly. For example, if the water content upstream is controlled by cooling the gas, it may be assumed that the gas is saturated with water at the cooler's temperature.

Using the detected flow rate of the acid gas stream 624 and the measured or known water vapor concentration, the operator may multiply these values to determine the total quantity of contaminant, i.e., water, that has gone to the solid adsorbent bed 625 over a period of time. By comparing this quantity to a model calculation of the bed capacity (optionally taking its age into account), it is possible to determine a more optimal cycle time. This may be done automatically by using a distributed control unit 811.

An alternative means of modifying the cycle is to provide a measurement device capable of on-line measurement of the water content near the effluent of the solid adsorbent bed 625 used for dehydration. A control system 800B that uses such a measurement device is provided in FIG. 8B. The control system 800B uses a direct feedback control.

Figure 8B:
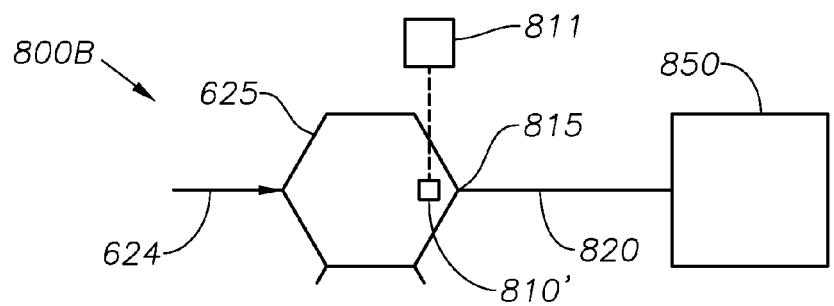
FIG. 8B provides a schematic diagram of a control system that uses a direct feed control. The illustrative control system is used to control cycle times for a solid adsorbent upstream of a cryogenic gas processing system.

FIG. 8B provides a schematic diagram of a control system 800B that uses a direct feedback control. In FIG. 8B, the solid adsorbent bed 625 from system 600 used for dehydration is again seen. In addition, partially dehydrated raw gas stream 624 is indicated. The raw gas stream 624 is being directed into the bed 625 for further dehydration. The raw gas stream 624 is ultimately processed (after further dehydration using bed 625) in the acid gas removal system 850.

Unlike control system 800A, the control system 800B does not include a flow meter. However, the control system 800B does include a measurement device 810'. Instead of measuring the concentration of acid gases in the raw gas stream 624, the measurement device 810' measures the concentration of water above the exit to the solid adsorbent bed 625. The measurement device 810' samples effluent immediately inside the bed 625 or just above an outlet 815. In this way, the adsorbent can be switched before any contaminant, i.e, water, passes the outlet 815. Preferably, the measurement device 810' is placed about a foot above a bottom of the solid adsorbent bed 625 to avoid any leakage of water vapor into the treated gas.

The measurements taken by the measurement device 810' are sent to a control unit 811. The control unit 811 comprises a central processing unit, or CPU. The CPU may be implemented as any type of processor including commercially available microprocessors from companies such as Intel, AMD, Motorola, Hitachi and NEC. The control unit 811 receives water measurements from the measurement device 810' and determines if the bed 625 is close to water breakthrough. If the bed 625 is close to full capacity, the control unit 811 sends the appropriate signal to end the dehydration service cycle for that bed. The next solid adsorbent bed (that is, a bed that has been in acid gas removal service) is then placed into dehydration service.

The control systems 800A and 800B are demonstrated in the context of measuring water concentrations in connection with the operation of a solid adsorbent bed used for dehydration. Such a solid adsorbent bed is used in the present context upstream of a cryogenic distillation tower. However, the control systems 800A and 800B may likewise be used in connection with the operation of a solid adsorbent bed used for removal of $CO_2$ from an overhead methane stream. Such a solid adsorbent bed is used in the present context downstream of the cryogenic distillation tower.

The use of molecular sieve equipment downstream from a cryogenic distillation tower is not only advantageous for reducing acid gas concentrations to meet LNG specifications during normal operations, but may also be utilized to initially remove $CO_2$ from the raw gas stream during "dirty" startup. Such a system is described more fully in connection with U.S. Pat. No. 5,062,270. FIG. 1 of that patent and the accompanying textual description are referred to and incorporated herein by reference.

In operation, the raw gas stream is initially fed into a dehydration vessel (such as dehydration vessel 620). Prior to entering the distillation tower, the gas stream is next passed through refrigeration equipment in order to generate a chilled raw gas stream. The refrigeration equipment may comprise a propane chiller that lowers the temperature of the raw gas stream to about −35° F. The refrigeration equipment may also include an inlet chiller that further reduces the temperature of the raw gas stream to about −40° F. to −65° F. The refrigeration equipment may also include an expansion device to provide still further cooling of the dehydrated gas. The expansion device may be a turbo expander, a hydraulic turbine or a Joule-Thompson valve. The expansion device further reduces the temperature of the raw gas stream to about −112° F. to −123° F.

The dehydrated and chilled gas stream is next fed into the distillation tower. The distillation tower operates to separate the raw gas stream into an overhead methane stream and a bottom acid gas stream, as discussed above in connection with either of towers 100 or 640. The entire reflux plus sales stream is treated with the downstream molecular sieve bed.

The distillation column (such as tower 640), including the rectification section and the cross-exchanger (such as cross-exchanger 664) are cooled by initiating the refrigeration systems upstream of the column, but not making them so cold as to generate solid $CO_2$ on heat transfer surfaces within the chillers. During this time, sweetened methane gas is released from the column overhead and then flowed through the solid adsorbent bed downstream of the column in order to remove $CO_2$. The gas is then recycled to the inlet of the column such that a progressively lower $CO_2$ content is achieved. Once the $CO_2$ content is low enough to meet initial pipeline specifications, the refrigeration can be adjusted to normal levels, as there will not be sufficient $CO_2$ in the gas to freeze out on the heat transfer surfaces within the heat exchangers.

It is noted that no gas goes to the sales pipeline (or LNG plant) while gas is being recycled through the column. Post-polishing removes just enough $CO_2$ so that inlet piping and internal components of the distillation tower do not accumulate solids during the latter stages of start-up. Stated another way, gas containing high levels of $CO_2$ is not initially exposed to cold surfaces within the distillation tower or the cross-exchanger where $CO_2$ may freeze and cause plugging. Once appropriate $CO_2$ concentration profiles are established, the sweetened gas can be processed through the refrigeration system and the molecular sieve bed downstream of the column, with a substantial portion of the overhead methane product going to sales or to an LNG process.

It is also noted that during start-up, a portion of the polished gas is delivered to the distillation tower as liquid reflux. The molecular sieve bed removes $CO_2$ to low levels so that the distillation tower will not freeze out significant $CO_2$ as the liquid reflux is sprayed down through the rectification section.

While it will be apparent that the inventions herein described are well calculated to achieve the benefits and advantages set forth above, it will be appreciated that the inventions are susceptible to modification, variation and change without departing from the spirit thereof. Improvements to the operation of an acid gas removal process using a controlled freezing zone are provided. The improvements provide a design for the removal of $CO_2$ down to very low levels in the product gas. The inventions herein also reduce the refrigeration requirements of cryogenic distillation towers while meeting LNG specifications for maximum allowable $CO_2$

What is claimed is:

1. A system for removing acid gases from a raw gas stream, comprising:
    a distillation tower for receiving and then separating the raw gas stream into an overhead methane and a bottom liquefied acid gas stream;
    a first solid adsorbent bed upstream of the distillation tower for at least partially removing a first contaminant from the raw gas stream; and
    a second solid adsorbent bed downstream of the distillation tower for adsorbing a least some of a second contaminant from the cooled overhead methane stream,
        wherein the second solid adsorbent bed downstream of the distillation tower is a regenerated solid adsorbent bed configured for service as the first solid absorbent bed upstream of the distillation tower when saturated with the second contaminant,
    wherein the distillation tower is a cryogenic distillation tower, the system further comprising:
    refrigeration equipment downstream of the cryogenic distillation tower for cooling the overhead methane stream and returning a portion of the overhead methane stream to the cryogenic distillation tower as liquid reflux;
    wherein the refrigeration equipment generates liquid reflux in a sufficient quantity to remove acid gases from the raw gas stream within the cryogenic distillation tower down to a first selected composition, and delivers the overhead methane stream to the second solid adsorbent bed downstream of the cryogenic distillation tower to remove the remaining acid gases down to a second selected composition.

2. The system of claim 1, wherein:
    the second contaminant is carbon dioxide;
    the quantity of the generated liquid reflux is sufficient to remove carbon dioxide from the raw gas stream down to the first composition of about 1 to 4 mol. percent; and
    the second solid adsorbent bed downstream of the distillation tower removes additional carbon dioxide from the overhead methane stream down to the second composition of about 0.2 to 3.0 mol. percent.

3. The system of claim 2, wherein the second contaminant is carbon dioxide, and wherein the second solid adsorbent bed downstream of the cryogenic distillation tower removes carbon dioxide from the overhead methane stream down to a composition less than about 100 ppm.

4. The system of claim 3, wherein the second contaminant is carbon dioxide, and wherein the second solid adsorbent bed downstream of the cryogenic distillation tower removes carbon dioxide from the overhead methane stream down to a composition less than about 50 ppm.

5. The system of claim 2, wherein the second solid adsorbent bed downstream of the cryogenic distillation tower is a molecular sieve bed.

6. The system of claim 5, wherein:
    the second contaminant is hydrogen sulfide; and
    the molecular sieve bed of the second solid adsorbent bed downstream of the cryogenic distillation tower removes hydrogen sulfide from the overhead methane stream down to a composition less than about 10 ppm.

7. The system of claim 6, wherein the second contaminant is hydrogen sulfide, and wherein the molecular sieve bed of the second solid adsorbent bed downstream of the cryogenic distillation tower removes hydrogen sulfide from the overhead methane stream down to a composition less than about 4 ppm.

8. The system of claim 5, wherein:
    the first solid adsorbent bed upstream of the cryogenic distillation tower is a molecular sieve bed; and
    the system further comprises at least one additional solid adsorbent bed in reserve, wherein the at least one additional solid adsorbent bed in reserve is also a molecular sieve bed.

9. The system of claim 2, further comprising:
    one or more vessels downstream of the cryogenic distillation tower for further separating carbon dioxide from methane using either ionic liquids, physical solvents, or chemical solvents.

10. The system of claim 1, further comprising a control system for controlling cycle times of the first solid adsorbent bed upstream of the distillation tower.

11. The system of claim 10, wherein the first contaminant is water, and wherein the control system comprises:
    a measurement device for measuring the composition of water in the raw gas stream upstream of the first solid adsorbent bed upstream of the distillation tower; and
    a flow meter for measuring the rate of flow of the raw gas stream into the first solid adsorbent bed upstream of the distillation tower.

12. The system of claim 10, wherein the first contaminant is water, and wherein the control system comprises:
    a measurement device for measuring the composition of water of the effluent of the first solid adsorbent bed upstream of the distillation tower; and
    the control system is configured to shut off the flow of fluids through the first solid adsorbent bed upstream of the distillation tower when the measurement device senses a predetermined level of water.

13. The system of claim 1, wherein the second contaminant is carbon dioxide, and wherein:
a quantity of the generated liquid reflux is sufficient to remove carbon dioxide from the raw gas stream down to a first composition that meets a pipeline specification; and
the second solid adsorbent bed downstream of the cryogenic distillation tower removes carbon dioxide from the overhead methane stream down to the second selected acid gas composition that meets an LNG specification.

14. The system of claim 1, wherein the refrigeration equipment comprises an open loop refrigeration system.

15. The system of claim 1, wherein the refrigeration equipment comprises a closed loop refrigeration system.

16. The system of claim 1, wherein:
the raw gas stream further comprises nitrogen; and
the system further comprises a third solid adsorbent bed downstream of the distillation tower for adsorbing at least some nitrogen from the cooled overhead methane stream.

17. A method for removing acid gases from a raw gas stream, comprising:
providing a cryogenic distillation tower, the tower having a lower distillation zone and an intermediate controlled freezing zone that receives a cold liquid spray comprised primarily of methane;
receiving the raw gas stream into the cryogenic distillation tower;
separating the raw gas stream in the cryogenic distillation tower into an overhead methane stream and a bottom acid gas stream;
passing the overhead methane stream through a refrigeration system downstream of the cryogenic distillation tower, the refrigeration system cooling the overhead methane stream;
returning a first portion of the cooled overhead methane stream to the cryogenic distillation tower as liquid reflux to serve as the cold liquid spray;
passing a second portion of the cooled overhead methane stream through a first solid adsorbent bed downstream of the cryogenic distillation tower so as to remove additional acid gases comprising a first contaminant and to generate a polished gas stream;
producing, with the refrigeration system, the liquid reflux at a sufficient quantity as to remove acid gases from the raw gas stream within the cryogenic distillation tower down to a first selected composition, and delivering the overhead methane stream to the first solid adsorbent bed downstream of the cryogenic distillation tower to remove additional acid gases down to a second selected composition;
at least partially dehydrating the raw gas stream by passing the raw gas stream through a second solid adsorbent bed upstream of the cryogenic distillation tower to remove a second contaminant, wherein the first solid adsorbent bed downstream of the cryogenic distillation tower and the second solid adsorbent bed upstream of the cryogenic distillation tower are each molecular sieve beds; and
saturating the second solid adsorbent bed upstream of the cryogenic distillation tower with adsorbed water and replacing the second solid adsorbent bed upstream of the cryogenic distillation tower with the molecular sieve bed of the first solid adsorbent bed that has become saturated with acid gas through use as the second solid adsorbent bed downstream of the cryogenic distillation tower, wherein saturating the second solid adsorbent bed upstream of the cryogenic distillation tower with adsorbed water at least partially displaces acid gas components from the second solid adsorbent bed that were adsorbed while the second solid adsorbent bed was in service downstream of the cryogenic distillation tower.

18. The method of claim 17, wherein: the acid gases comprise carbon dioxide;
generating the quantity of liquid reflux is sufficient to remove carbon dioxide from the raw gas stream down to a first composition of about 1 to 4 mol. percent; and
removing additional carbon dioxide from the overhead methane stream down to a second composition of about 0.2 to 3.0 mol. percent in the first solid adsorbent bed downstream of the cryogenic distillation tower.

19. The method of claim 18, further comprising:
providing one or more vessels downstream of the cryogenic distillation tower for further separating carbon dioxide from methane using either ionic liquids, physical solvents, or chemical solvents.

20. The method of claim 18, wherein:
the acid gases further comprise hydrogen sulfide; and
removing hydrogen sulfide from the overhead methane stream down to a composition less than about 10 ppm in the first solid adsorbent bed downstream of the cryogenic distillation tower.

21. The method of claim 20, wherein:
the first solid adsorbent bed downstream of the cryogenic distillation tower is a molecular sieve bed; and
removing hydrogen sulfide from the overhead methane stream down to a composition less than about 4 ppm in the molecular sieve bed of the first solid adsorbent bed downstream of the cryogenic distillation tower.

22. The method of claim 17, wherein:
generating the quantity of liquid reflux is sufficient to remove carbon dioxide from the raw gas stream down to the first composition that meets a pipeline specification; and
removing carbon dioxide from the overhead methane stream down to the second selected composition that meets an LNG specification in the first solid adsorbent bed downstream of the cryogenic distillation tower.

23. The method of claim 22, wherein the pipeline specification requires a carbon dioxide content that is less than about 3.0 mol. percent.

24. The method of claim 22, wherein the LNG specification requires a carbon dioxide content that is less than about 50 ppm.

25. The method of claim 22, removing carbon dioxide from the overhead methane stream down to a composition less than about 100 ppm in the first solid adsorbent bed downstream of the cryogenic distillation tower.

26. The method of claim 25, wherein the solid adsorbent bed downstream of the cryogenic distillation tower is a molecular sieve bed.

27. A method for removing acid gases from a raw gas stream, comprising:
providing a cryogenic distillation tower, the tower having a lower distillation zone and an intermediate controlled freezing zone that receives a cold liquid spray comprised primarily of methane;
receiving the raw gas stream into the cryogenic distillation tower; separating the raw gas stream in the cryogenic distillation tower into an overhead methane stream and a bottom acid gas stream;

passing the overhead methane stream through a refrigeration system downstream of the cryogenic distillation tower, the refrigeration system cooling the overhead methane stream;

returning a first portion of the cooled overhead methane stream to the cryogenic distillation tower as liquid reflux to serve as the cold liquid spray;

passing a second portion of the cooled overhead methane stream through a first solid adsorbent bed downstream of the cryogenic distillation tower so as to remove additional acid gases and to generate a polished gas stream;

producing, in the refrigeration system, liquid reflux at a sufficient quantity as to remove acid gases from the raw gas stream within the cryogenic distillation tower down to a first selected composition, and delivering the overhead methane stream to the first solid adsorbent bed downstream of the cryogenic distillation tower to remove additional acid gases down to a second selected composition, wherein;

the acid gases comprises a first contaminant, the first contaminant is carbon dioxide, generating the quantity of the liquid reflux is sufficient to remove carbon dioxide from the raw gas stream down to a first composition of about 1 to 4 mol. percent, and removing additional carbon dioxide from the overhead methane stream down to a second composition of about 0.2 to 3.0 mol. percent in the first solid adsorbent bed downstream of the cryogenic distillation tower;

at least partially dehydrating the raw gas stream by passing the raw gas stream through a second solid adsorbent bed upstream of the cryogenic distillation tower and removing a second contaminant, wherein the second contaminant is water;

replacing the second solid adsorbent bed upstream of the cryogenic distillation tower with a molecular sieve bed that has become saturated with acid gas through use as the first solid adsorbent bed downstream of the cryogenic distillation tower; and at least partially displacing acid gas components from the first solid adsorbent bed upstream of the cryogenic distillation tower by saturating the first solid adsorbent bed upstream of the cryogenic distillation tower with adsorbed water.

28. The method of claim 27, further comprising:

regenerating the molecular sieve bed upstream of the cryogenic distillation tower after the molecular sieve bed upstream of the cryogenic distillation tower becomes substantially saturated with water.

29. The method of claim 28, wherein regenerating the molecular sieve bed upstream of the cryogenic distillation tower uses either thermal swing adsorption or pressure swing adsorption.

30. The method of claim 28, further comprising:

replacing the molecular sieve bed downstream of the cryogenic distillation tower when the molecular sieve bed downstream of the cryogenic distillation tower becomes substantially saturated with carbon dioxide with a regenerated molecular sieve bed previously in service for dehydration upstream of the cryogenic distillation tower.

31. A method for removing acid gases from a raw gas stream, further comprising:

providing a cryogenic distillation tower, the tower having a lower distillation zone and an intermediate controlled freezing zone that receives a cold liquid spray comprised primarily of methane;

receiving the raw gas stream into the cryogenic distillation tower;

separating the raw gas stream in the cryogenic distillation tower into an overhead methane stream and a bottom acid gas stream;

passing the overhead methane stream through a refrigeration system downstream of the cryogenic distillation tower, the refrigeration system cooling the overhead methane stream;

returning a first portion of the cooled overhead methane stream to the cryogenic distillation tower as liquid reflux to serve as the cold liquid spray;

passing a second portion of the cooled overhead methane stream through a first solid adsorbent bed downstream of the cryogenic distillation tower so as to remove additional acid gases and to generate a polished gas stream;

producing, with the refrigeration system, liquid reflux at a sufficient quantity as to remove acid gases from the raw gas stream within the cryogenic distillation tower down to a first selected composition, and delivering the overhead methane stream to the first solid adsorbent bed downstream of the cryogenic distillation tower to remove additional acid gases down to a second selected composition, wherein the acid gases comprise a first contaminant;

the first contaminant is carbon dioxide, generating the quantity of the liquid reflux is sufficient to remove carbon dioxide from the raw gas stream down to a first composition of about 1 to 4 mol. percent, and removing additional carbon dioxide from the overhead methane stream down to a second composition of about 0.2 to 3.0 mol. percent in the first solid adsorbent bed downstream of the cryogenic distillation tower;

injecting at least a portion of the bottom acid gas stream into a subsurface formation through at least one acid gas injection well;

at least partially dehydrating the raw gas stream by passing the raw gas stream through a second solid adsorbent bed upstream of the cryogenic distillation tower and removing a second contaminant, wherein the second contaminant is water, and wherein the first solid adsorbent bed downstream of the cryogenic distillation tower is a molecular sieve bend and the second solid adsorbent bed upstream of the cryogenic distillation tower is a molecular sieve bed; and saturating the molecular sieve bed upstream of the cryogenic distillation tower with adsorbed water and replacing the molecular sieve bed upstream of the cryogenic distillation tower with the molecular sieve bed downstream of the cryogenic distillation tower that has become saturated with acid gas through use as the first solid adsorbent bed downstream of the cryogenic distillation tower.

* * * * *